United States Patent
Joseph et al.

(10) Patent No.: US 11,349,938 B2
(45) Date of Patent: May 31, 2022

(54) EXHANGING SERVICE CAPABILITY EXPOSURE FUNCTION (SCEF)-RELATED INFORMATION OF A USER EQUIPMENT

(71) Applicant: QUALCOMM Incorporated, San Diego, CA (US)

(72) Inventors: Vinay Joseph, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 15/934,942

(22) Filed: Mar. 23, 2018

(65) Prior Publication Data
US 2018/0278698 A1    Sep. 27, 2018

Related U.S. Application Data

(60) Provisional application No. 62/476,523, filed on Mar. 24, 2017.

(51) Int. Cl.
| | |
|---|---|
| *H04W 8/10* | (2009.01) |
| *H04L 67/51* | (2022.01) |
| *H04W 8/08* | (2009.01) |
| *H04W 92/02* | (2009.01) |

(Continued)

(52) U.S. Cl.
CPC .............. *H04L 67/16* (2013.01); *H04W 8/08* (2013.01); *H04W 8/10* (2013.01); *H04W 48/08* (2013.01);
(Continued)

(58) Field of Classification Search
CPC ........ H04L 67/16; H04W 48/08; H04W 8/04; H04W 8/08; H04W 8/10; H04W 8/18; H04W 8/26; H04W 92/02
See application file for complete search history.

(56) References Cited

U.S. PATENT DOCUMENTS

| | | | |
|---|---|---|---|
| 2015/0264634 A1* | 9/2015 | Ding | H04W 48/14 455/434 |
| 2016/0286385 A1 | 9/2016 | Ryu et al. | |

(Continued)

FOREIGN PATENT DOCUMENTS

| | | |
|---|---|---|
| CN | 105939522 A | 9/2016 |
| WO | 2014051618 A1 | 4/2014 |
| WO | 2017027071 A1 | 2/2017 |

OTHER PUBLICATIONS

"3rd Generation Partnership Project; Technical Specification Group Services and System Aspects; Architecture Enhancements for Service Capability Exposure (Release 13)", 3GPP Standard; Technical Report; 3GPP TR 23.708, 3rd Generation Partnership Project (3GPP), Mobile Competence Centre; 650, Route Des Lucioles; F-06921 Sophia-Antipolis Cedex; France, vol. SA WG2, No. V13.0.0, Jun. 21, 2015, pp. 1-31, XP051294242, [retrieved on Jun. 21, 2015].

(Continued)

*Primary Examiner* — Khaled M Kassim
*Assistant Examiner* — Zhaohui Yang
(74) *Attorney, Agent, or Firm* — Muncy, Geissler, Olds & Lowe, P.C./QUALCOMM

(57) ABSTRACT

A non-MNO PSP network maintains a table that maps external subscriber identifiers of UEs to intermediate subscriber identifiers of the UEs on an interface between the non-MNO PSP network and NHN(s). The non-MNO PSP network obtains an SCEF-related message including either an external subscriber identifier or an intermediate subscriber identifier for the UE. Using the table, the non-MNO PSP network forwards the SCEF-message to a serving NHN or to an external application. In another embodiment, an NHN maintains a table that maps internal identifiers of UEs within the NHN to intermediate subscriber identifiers that identify the UEs on an interface between the NHN and non-MNO PSP(s). The NHN obtains an SCEF-related mes- (Continued)

sage that includes an intermediate subscriber identifier or an internal identifier for the UE. Using the table, the NHN either processes the SCEF-related message within the NHN, or forwards the SCEF-related message to a non-MNO PSP outside the NHN.

61 Claims, 20 Drawing Sheets

(51) Int. Cl.
*H04W 48/08* (2009.01)
*H04W 8/04* (2009.01)
*H04W 8/18* (2009.01)
*H04W 8/26* (2009.01)

(52) U.S. Cl.
CPC .............. *H04W 92/02* (2013.01); *H04W 8/04* (2013.01); *H04W 8/18* (2013.01); *H04W 8/26* (2013.01)

(56) References Cited

U.S. PATENT DOCUMENTS

| | | | |
|---|---|---|---|
| 2017/0034767 A1 | 2/2017 | Griot et al. | |
| 2018/0054836 A1* | 2/2018 | Mizikovsky | .......... H04W 16/14 |
| 2018/0206093 A1* | 7/2018 | Jain | .......... H04W 4/70 |
| 2018/0249282 A1* | 8/2018 | McCann | .......... H04L 65/1063 |
| 2019/0028337 A1* | 1/2019 | Ryu | .......... H04W 4/70 |
| 2020/0022008 A1* | 1/2020 | Magee | .......... H04W 4/70 |

OTHER PUBLICATIONS

"3rd Generation Partnership Project; Technical Specification Group Services and System Aspects; Architecture Enhancements to Facilitate Communications With Packet Data Networks and Applications (Release 15)", 3GPP Standard; Technical Specification; 3GPP TS 23.682, 3rd Generation Partnership Project (3GPP), Mobile Competence Centre; 650, Route Des Lucioles; F-06921 Sophia-Antipolis Cedex; France, vol. SA WG2, No. V15.0.0, Mar. 13, 2017, pp. 1-109, XP051290445, [retrieved on Mar. 13, 2017].

International Search Report and Written Opinion—PCT/US2018/024318—ISA/EPO—dated Jun. 7, 2018.

Samsung, et al., "Introduction of Non-IP Data Delivery via the SCEF for Cellular IoT", 3GPP TSG-SA WG2 Meeting #112, S2-154024, Nov. 16-20, 2015, Anaheim, CA USA, 9 Pages.

* cited by examiner

EXHANGING SERVICE CAPABILITY EXPOSURE FUNCTION (SCEF)-RELATED INFORMATION OF A USER EQUIPMENT

CROSS-REFERENCE TO RELATED APPLICATION

The present Application for Patent claims the benefit of U.S. Provisional Application No. 62/476,523, entitled "EXHANGING SCEF-RELATED INFORMATION BETWEEN A NEUTRAL HOST NETWORK AND A NON-MNO PSP NETWORK USING AN INTERMEDIATE SUBSCRIBER IDENTIFIER THAT IDENTIFIES A SUBSCRIBER USER EQUIPMENT ON AN INTERFACE BETWEEN THE NEUTRAL HOST NETWORK AND THE NON-MNO PSP NETWORK", filed Mar. 24, 2017, which is by the same inventors as the subject application, assigned to the assignee hereof and hereby expressly incorporated by reference herein in its entirety.

BACKGROUND

1. Field of the Disclosure

Embodiments relate to exchanging Service Capability Exposure Function (SCEF)-related information between a neutral host network (NHN) and a non-mobile network operator (MNO) participating service provider (PSP) network using an intermediate subscriber identifier that identifies a user equipment (UE) on an interface between the NHN and the non-MNO PSP network.

2. Description of the Related Art

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "WiFi."

Small cell LTE operation may be deployed within neutral host networks (NHNs), which are controlled independently from 3GPP networks by respective neutral hosts. NHNs are self-contained networks that provide IP access to provide local IP services, and may also connect to 3GPP networks as well as to participating service provider (PSP) networks.

SUMMARY

An embodiment is directed to a method of operating a component of a non-Mobile Network Operator (MNO) Participating Service Provider (PSP) network, including maintaining, by the non-MNO PSP network, a table that maps a plurality of external subscriber identifiers configured to identify a plurality of user equipments (UEs) to a plurality of intermediate subscriber identifiers configured to identify the plurality of UEs on an interface between the non-MNO PSP network and one or more Neutral Host Networks (NHNs), obtaining, by the non-MNO PSP network, a Service Capability Exposure Function (SCEF)-related message in association with a first identifier maintained in the table for a given UE, retrieving, from the table by the non-MNO PSP network, a second identifier of the given UE that is mapped to the first identifier within the table, and forwarding, by the non-MNO PSP network, the SCEF-related message in association with the retrieved second identifier.

Another embodiment is directed to a component of a non-Mobile Network Operator (MNO) Participating Service Provider (PSP) network, including at least one processor coupled to at least one transceiver and configured to maintain a table that maps a plurality of external subscriber identifiers configured to identify a plurality of user equipments (UEs) to a plurality of intermediate subscriber identifiers configured to identify the plurality of UEs on an interface between the non-MNO PSP network and one or more Neutral Host Networks (NHNs), obtain a Service Capability Exposure Function (SCEF)-related message in association with a first identifier maintained in the table for a given UE, retrieve, from the table, a second identifier of the given UE that is mapped to the first identifier within the table, and forward the SCEF-related message in association with the retrieved second identifier.

Another embodiment is directed to a method of operating a component of a Neutral Host Network (NHN), including maintaining, by the NHN, a table that maps a plurality of internal identifiers configured to identify a plurality of user equipments (UEs) within the NHN to a plurality of intermediate subscriber identifiers configured to identify the plurality of UEs on an interface between the NHN and one or more non-Mobile Network Operator (MNO) Participating Service Provider (PSP) networks, obtaining, at the NHN from a given non-MNO PSP network, a Service Capability Exposure Function (SCEF)-related message in association with a first identifier maintained in the table for a given UE, retrieving, from the table by the NHN, a second identifier that is mapped to the first identifier within the table, and performing, by the NHN, an action on the SCEF-related message using the retrieved second identifier.

Another embodiment is directed to a component of a Neutral Host Network (NHN), including at least one processor coupled to at least one transceiver and configured to maintain a table that maps a plurality of internal identifiers configured to identify a plurality of user equipments (UEs) within the NHN to a plurality of intermediate subscriber identifiers configured to identify the plurality of UEs on an interface between the NHN and one or more non-Mobile Network Operator (MNO) Participating Service Provider (PSP) networks, obtain, from a given non-MNO PSP network, a Service Capability Exposure Function (SCEF)-related message in association with a first identifier maintained in the table for a given UE, retrieve, from the table, a second identifier that is mapped to the first identifier within the table, and perform an action on the SCEF-related message using the retrieved second identifier.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
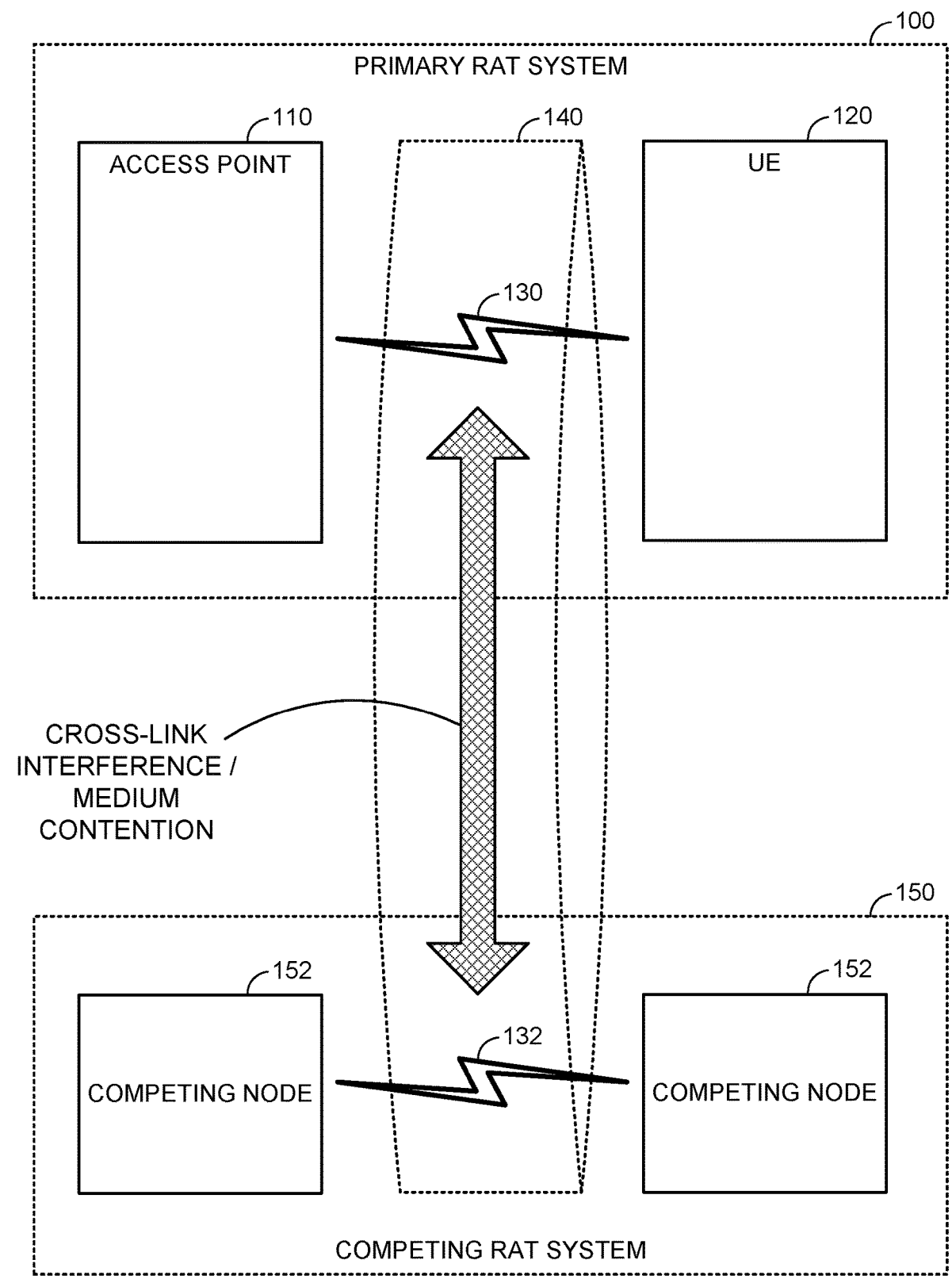
FIG. 1 is a system-level diagram illustrating an example wireless network environment, shown by way of example as including a "primary" Radio Access Technology (RAT) system and a "competing" RAT system.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an UE 120 in communication with each other over a wireless link 130. The competing RAT system 150 is shown as including two competing nodes 152 in communication with each other over a separate wireless link 132, and may similarly include one or more access points, UEs, or other types of wireless nodes. As an example, the access point 110 and the UE 120 of the primary RAT system 100 may communicate via the wireless link 130 in accordance with Long Term Evolution (LTE) technology (e.g., in accordance with MulteFire), while the competing nodes 152 of the competing RAT system 150 may communicate via the wireless link 132 in accordance with WiFi technology. It will be appreciated that each system may support any number of wireless nodes distributed throughout a geographic region, with the illustrated entities being shown for illustration purposes only.

Unless otherwise noted, the terms "UE" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (JOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with UEs depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including WiFi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication mediums such as unlicensed frequency bands.

Figure 2A:
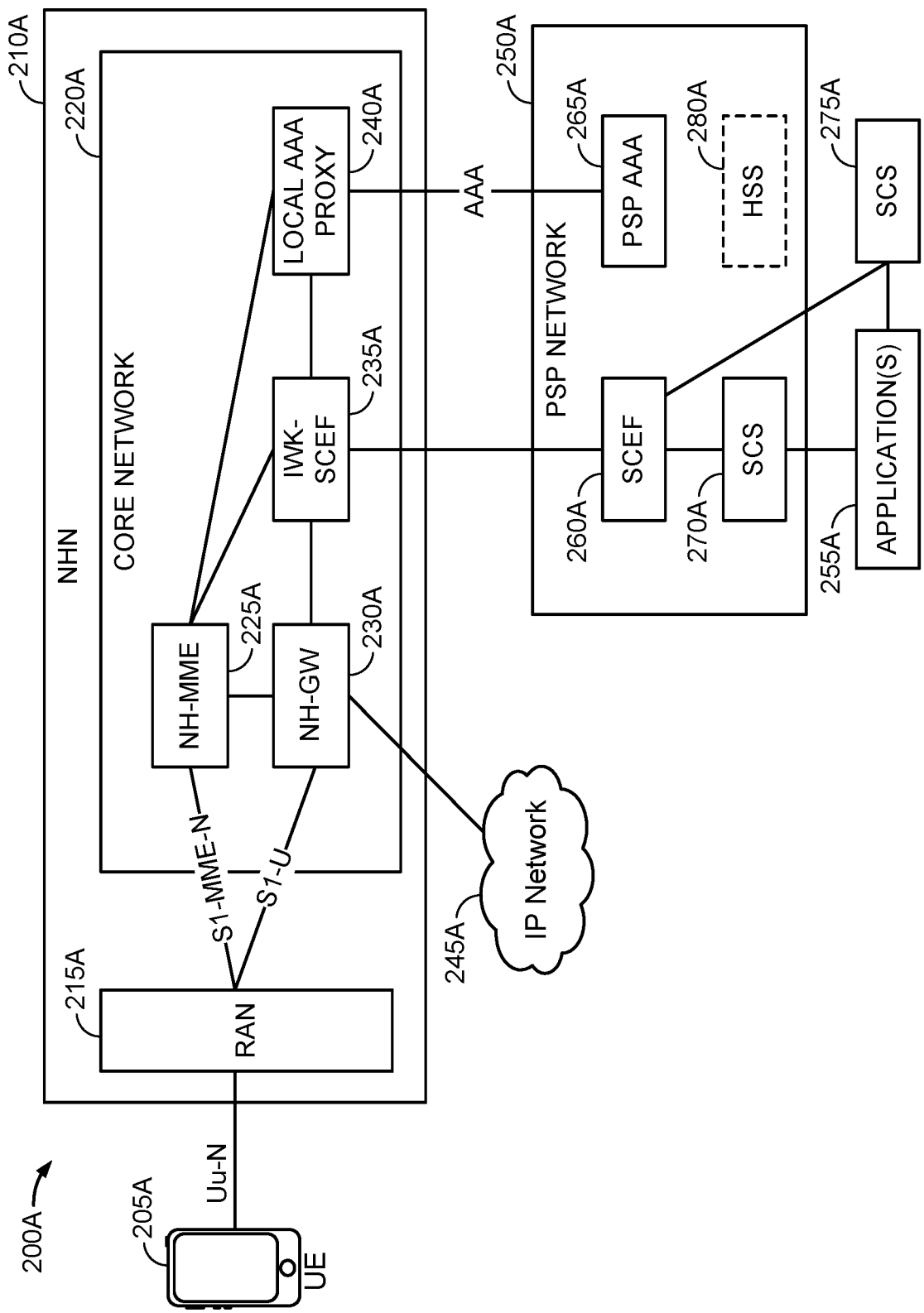
FIG. 2A illustrates a high-level system architecture of a wireless communications system 200A in accordance with an embodiment of the disclosure.

FIG. 2A illustrates a high-level system architecture of a wireless communications system 200A in accordance with an embodiment of the disclosure. The wireless communications system 200A includes a UE 205A that is in communication with (or attached to) a neutral host network (NHN) 210A. As shown in FIG. 2A, UE 205A is connected to RAN 215A over a Uu-N interface. In an example, the RAN 215A may be part of the primary RAT system 100 described above with respect to FIG. 1, and may include the access point 110 (e.g., a MulteFire AP).

Referring to FIG. 2A, the RAN 215A is connected to an NHN Mobility Management Entity (NH-MME) 225A of a core network 220A over a S1-MME-N interface and/or an NHN Gateway (NH-GW) 230A of the core network 220A over an S1-U interface. The core network 220A further includes an Interworking Function (IWK) Service Capability Exposure Function (SCEF) 235A and a local Authentication, Authorization, and Accounting (AAA) proxy 240A. The NH-GW 230A provides access to one or more IP networks 245A. The one or more IP networks 245A may provide access to local IP services, as well as a connection to one or more external 3GPP core networks (not shown). Moreover, in FIG. 2A, certain components of the core network 220A are omitted from illustration for the sake of brevity.

Referring to FIG. 2A, the NHN 210A may be implemented as either an untrusted non-3GPP network or a trusted 3GPP network (e.g., acting as a trusted WLAN). The NHN 210A advertises a unique NHN identifier (NHN-ID), and may not have a Public Land Mobile Network (PLMN) ID. The NHN 210A also advertises identifiers (PSP-IDs) associated with supported Participating Service Provider (PSP)

networks. Generally, UEs first discover which PSP networks are supported by available NHNs, after which the UEs select a NHN for attachment via an Attach procedure (described below in more detail) based on the supported PSP networks (e.g., a PSP network supporting access to subscription-based services that are a high-priority to a particular UE may be selected for attachment).

The core network 220A of the NHN 210A may be connected to at least one PSP network 250A. In an example, the PSP network 250A may correspond to any IP-based network. In an example, the PSP network 250A may correspond to a 3GPP Public Land Mobile Network (PLMN) that uses Universal Subscriber Identity Module (USIM)-based authentication. Alternatively, the PSP network 250A may rely upon non-SIM based subscriptions. The PSP network 250A provides access to subscription-based services (e.g., which require credentials and billing) from one or more applications 255A.

Referring to FIG. 2A, the IWK-SCEF 235A interfaces with a SCEF 260A at the PSP network 250A, and the local AAA proxy 240A interfaces with a PSP AAA 265A at the PSP network 250A. SCEF is defined in 3GPP Release 13+ to be the interface for small data transfers and control messaging between MNO core networks and external enterprise networks. The major features of SCEF include Application Programming Interfaces (API) and AAA, external identifiers, Non-IP Data Delivery (NIDD), Device Trigger Request, and Capability discovery. The PSP AAA 265A is used to authenticate a UE and confirm that the UE has sufficient credentials/privileges to access particular subscription-based services, as will be described below in more detail. The SCEF 260A is connected to at least one service capability server (SCS) 270A inside the PSP network 250A and may also be connected to one or more SCSs 275A external to the PSP network 250A. The SCSs 270A-275A provide access to one or more applications that provide subscription-based services.

Referring to FIG. 2A, the PSP network 250A optionally includes a Home Subscriber Server (HSS) 280A. For example, PSP networks may or may not be controlled by a Mobile Network Operator (MNO). PSP networks that are controlled by an MNO may be referred to as MNO PSP networks (e.g., using USIM-based authentication), and PSP networks that are not controlled by an MNO may be referred to as non-MNO PSP networks (e.g., using non-SIM based authentication). Moreover, in FIG. 2A, certain components of the PSP network 250A are omitted from illustration for the sake of brevity.

Figure 2B:
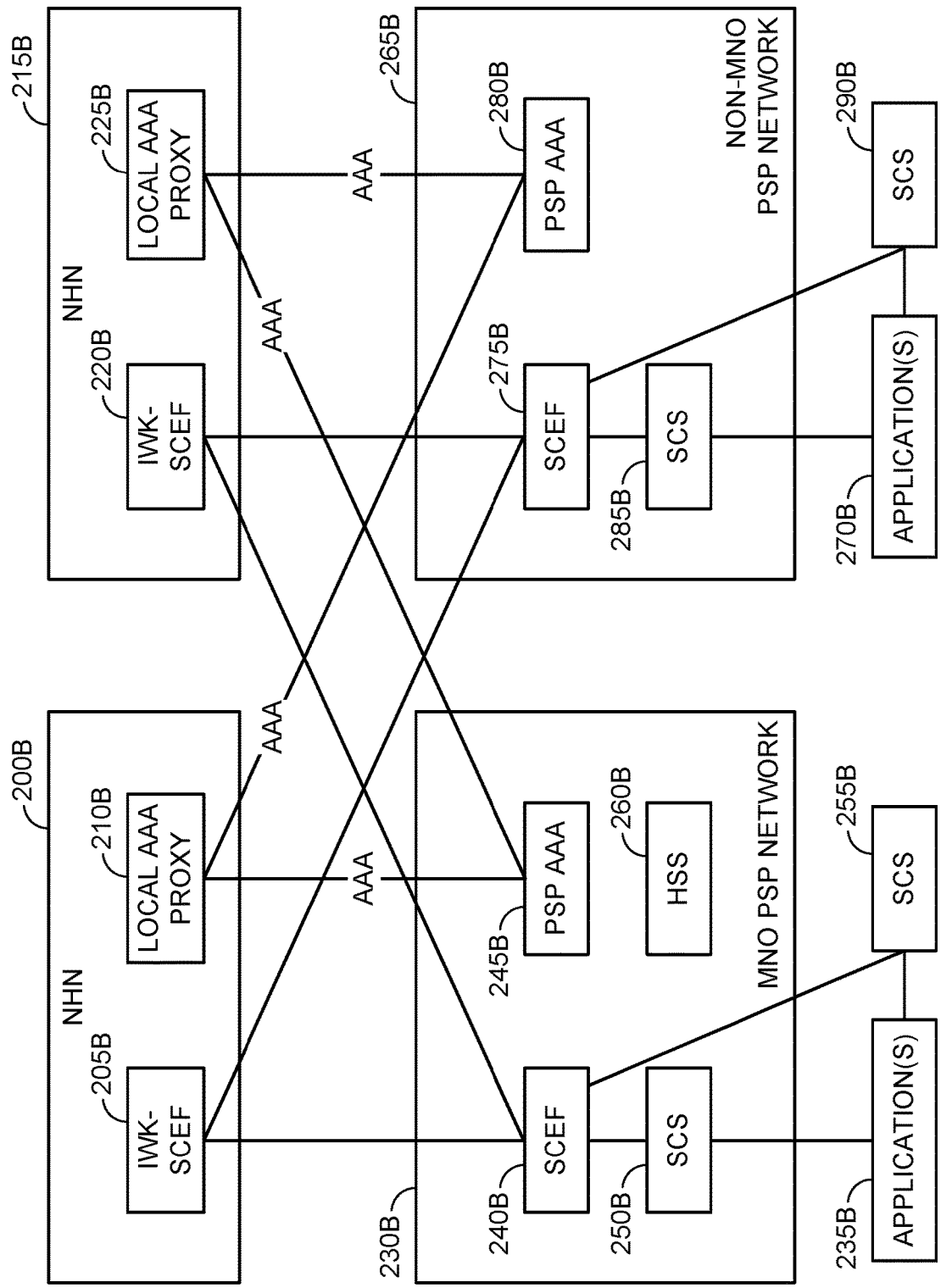
FIG. 2B illustrates interfaces between Neutral Host Networks (NHN)s and Participating Service Provider (PSP) networks in accordance with an embodiment of the disclosure.

FIG. 2B illustrates interfaces between NHNs and PSP networks in accordance with an embodiment of the disclosure. In FIG. 2B, an NHN 200B includes IWK-SCEF 205B and a local AAA proxy 210B, and an NHN 215B includes IWK-SCEF 220B and a local AAA proxy 225B. In an example, the NHNs 200B and 215B may each be configured as described above with respect to the NHN 210A of FIG. 2A. Further illustrated in FIG. 2B is MNO PSP network 230B along with associated applications 235B, SCEF 240B, PSP AAA 245B, SCSs 250B and 255B and HSS 260B, and non-MNO PSP network 265B along with associated applications 270B, SCEF 275B, PSP AAA 280B and SCSs 285B and 290B. As noted above, the MNO PSP network 230B includes HSS 260B, whereas the non-MNO PSP network 265B does not include an HSS.

Referring to FIG. 2B, the IWK-SCEFs 205B and 220B may interface with SCEF 240B at MNO PSP network 230B as well as with SCEF 275B at non-MNO PSP network 265B. Accordingly, an IWK-SCEF can interface with multiple SCEFs across different PSP networks, and an SCEF can likewise interface with multiple IWK-SCEFs across different NHNs. Further, the local AAA proxies 210B and 225B may interface with PSP AAA 245B at MNO PSP network 230B as well as with PSP AAA 280B at non-MNO PSP network 265B. Accordingly, a local AAA proxy at an NHN can interface with multiple PSP AAAs across different PSP networks, and a PSP AAA at a PSP network can likewise interface with multiple local AAA proxies across different NHNs.

Figure 3:
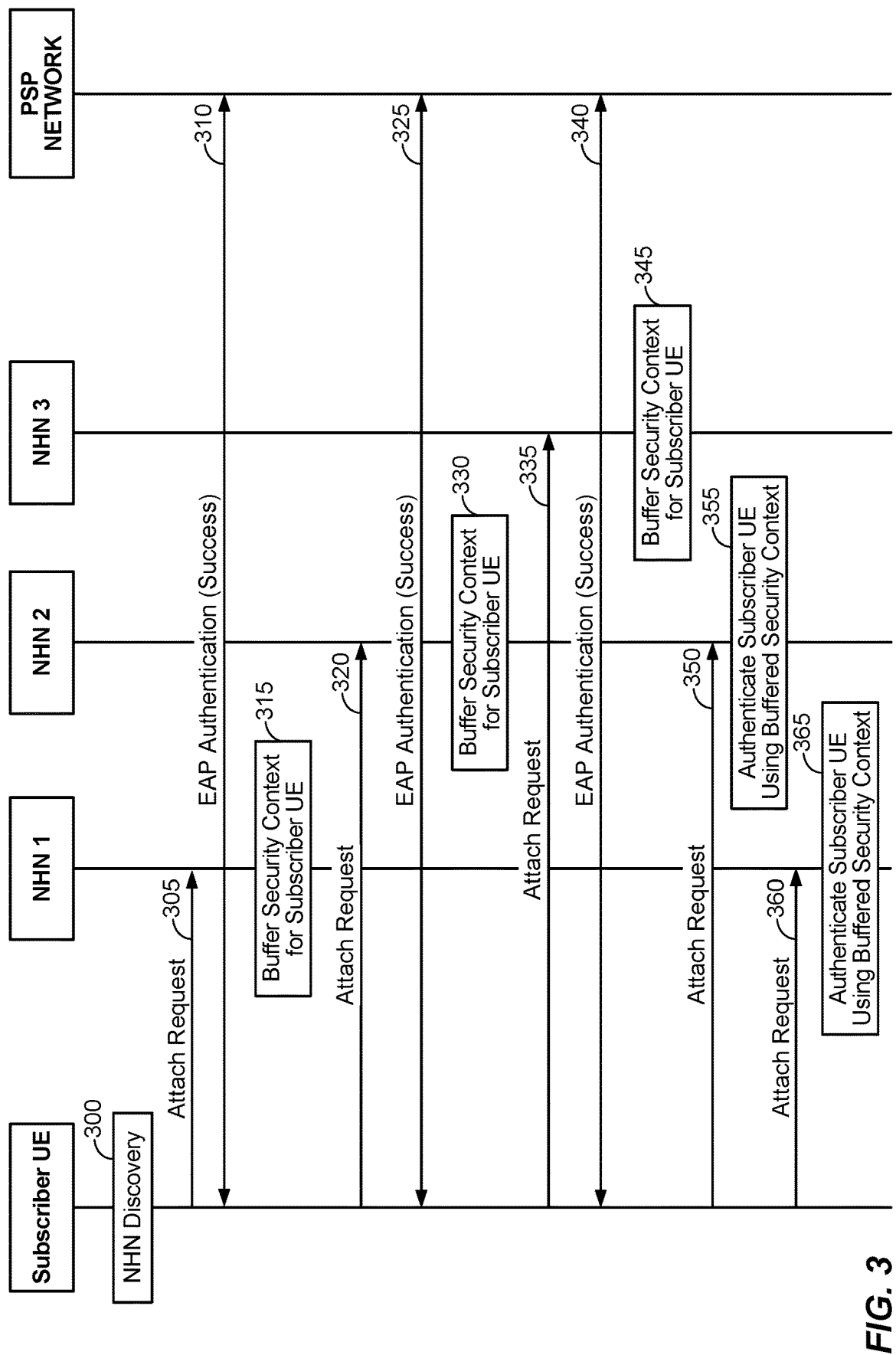
FIG. 3 illustrates a series of Attach procedures performed with respect to different NHNs in accordance with an embodiment of the disclosure.

In SCEF as defined in 3GPP Release 13+, PSP authentication is required when a UE (referred to herein as a "subscriber UE" based on the UE having a subscription with one or more PSP networks) first attempts to perform an Attach procedure with respect to a particular target NHN. FIG. 3 illustrates a series of Attach procedures performed with respect to different NHNs in accordance with an embodiment of the disclosure. In the embodiment of FIG. 3, each Attach procedure is described with respect to the same PSP network, although this is not expressly required (e.g., the PSP network associated with the subscription-based services to be accessed via a respective NHN can vary). Moreover, the PSP network described below with respect to FIG. 3 may correspond to either a MNO PSP network or a non-MNO PSP network.

Referring to FIG. 3, a subscriber UE performs NHN discovery and determines to perform an Attach procedure with respect to NHN 1, 300. The subscriber UE transmits an Attach request to NHN 1, 305, after which the subscriber UE is authenticated via an Authentication procedure performed with the PSP network, 310. For example, a local AAA proxy at NHN 1 may interact with a PSP AAA at the PSP network to perform the authentication at 310, or alternatively the subscriber UE itself may interact with the PSP network to facilitate the Authentication procedure. In an example, the Authentication procedure of 310 may correspond to Extensible Authentication Protocol (EAP)-based authentication.

Once the subscriber UE is authenticated at 310, NHN 1 buffers a security context for the subscriber UE, 315. If the subscriber UE attaches to another NHN and then returns to NHN 1 via an Attach procedure, the buffered security context is used to re-authenticate the subscriber UE without additional interaction with the PSP network. Hence, the PSP network is not notified with respect to an Attach procedure that is authenticated using the buffered security context. In an example, the buffered security context may have an expiration period, with a new PSP-based Authentication procedure being required after expiration (e.g., to remain attached to a particular NHN, or in association with a new Attach procedure).

Referring to FIG. 3, assume that the subscriber UE determines to attach to NHN 2, and thereby begins an Attach procedure by sending an Attach request to NHN 2, 320 (e.g., similar to 305), after which the subscriber UE is authenticated via an Authentication procedure performed with the PSP network, 325 (e.g., similar to 310). Once the subscriber UE is authenticated at 325, NHN 2 buffers a security context for the subscriber UE, 330.

Referring to FIG. 3, assume the subscriber UE determines to attach to NHN 3, and thereby begins an Attach procedure by sending an Attach request to NHN 3, 335 (e.g., similar to 305 or 320), after which the subscriber UE is authenticated via an Authentication procedure performed with the PSP network, 340 (e.g., similar to 310 or 325). Once the subscriber UE is authenticated at 340, NHN 3 buffers a security context for the subscriber UE, 345.

Referring to FIG. 3, assume the subscriber UE determines to re-attach to NHN 2, and thereby begins an Attach procedure by sending an Attach request to NHN 2, 350. In this case, assume that the buffered security context from 330 has not yet expired. Accordingly, at 355, the NHN 2 authenticates the subscriber UE using the buffered security context, and the PSP network is not involved or notified of the NHN 2 attachment.

Referring to FIG. 3, assume the subscriber UE determines to re-attach to NHN 1, and thereby begins an Attach procedure by sending an Attach request to NHN 1, 360. In this case, assume that the buffered security context from 315 has not yet expired. Accordingly, at 365, the NHN 1 authenticates the subscriber UE using the buffered security context, and the PSP network is not involved or notified of the NHN 1 attachment.

Figure 4A:
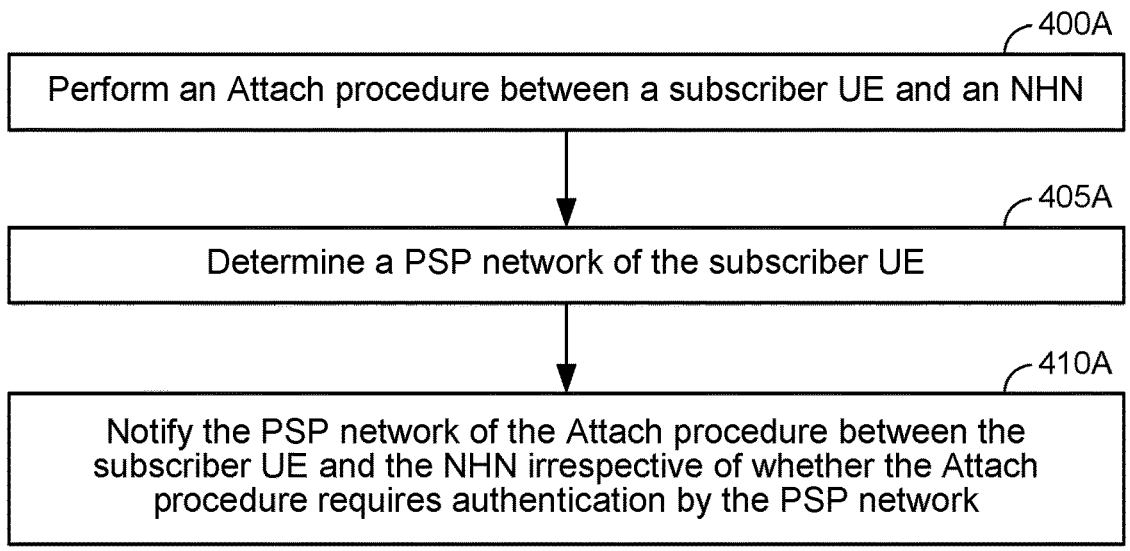
FIG. 4A illustrates a process of notifying a subscriber user equipment (UE)'s PSP network with respect to NHN attachment of the subscriber UE in accordance with an embodiment of the disclosure.

As will be appreciated from a review of FIG. 3, if the PSP network obtains SCEF-related messages associated with the subscriber UE, the PSP network may not necessarily know the current serving NHN of the subscriber UE for forwarding the SCEF-related messages. For example, the PSP network is not notified of the subscriber UE's re-attachment to NHN 2 at 350-355, or the subscriber UE's re-attachment to NHN 1 at 360-365. At least one of the embodiments of the disclosure are thereby related to notifying the PSP network of a new NHN attachment irrespective of whether an associated Attach procedure requires authentication by the PSP network FIG. 4A illustrates a process of notifying the subscriber UE's PSP network with respect to NHN attachment of a subscriber UE in accordance with an embodiment of the disclosure. The process of FIG. 4A is performed by a device, such as a subscriber UE or a component of an NHN (e.g., a local AAA proxy of the NHN). At 400A, the device (e.g., subscriber UE or NHN component) performs an Attach procedure between a subscriber UE and an NHN. At 405A, the device determines a PSP network of the subscriber UE (i.e., a PSP network to which the subscriber UE subscribes). At 410A, the device notifies the PSP network determined at 405A of the Attach procedure between the subscriber UE and the NHN irrespective of whether the Attach procedure requires authentication by the PSP network.

Figure 4B:
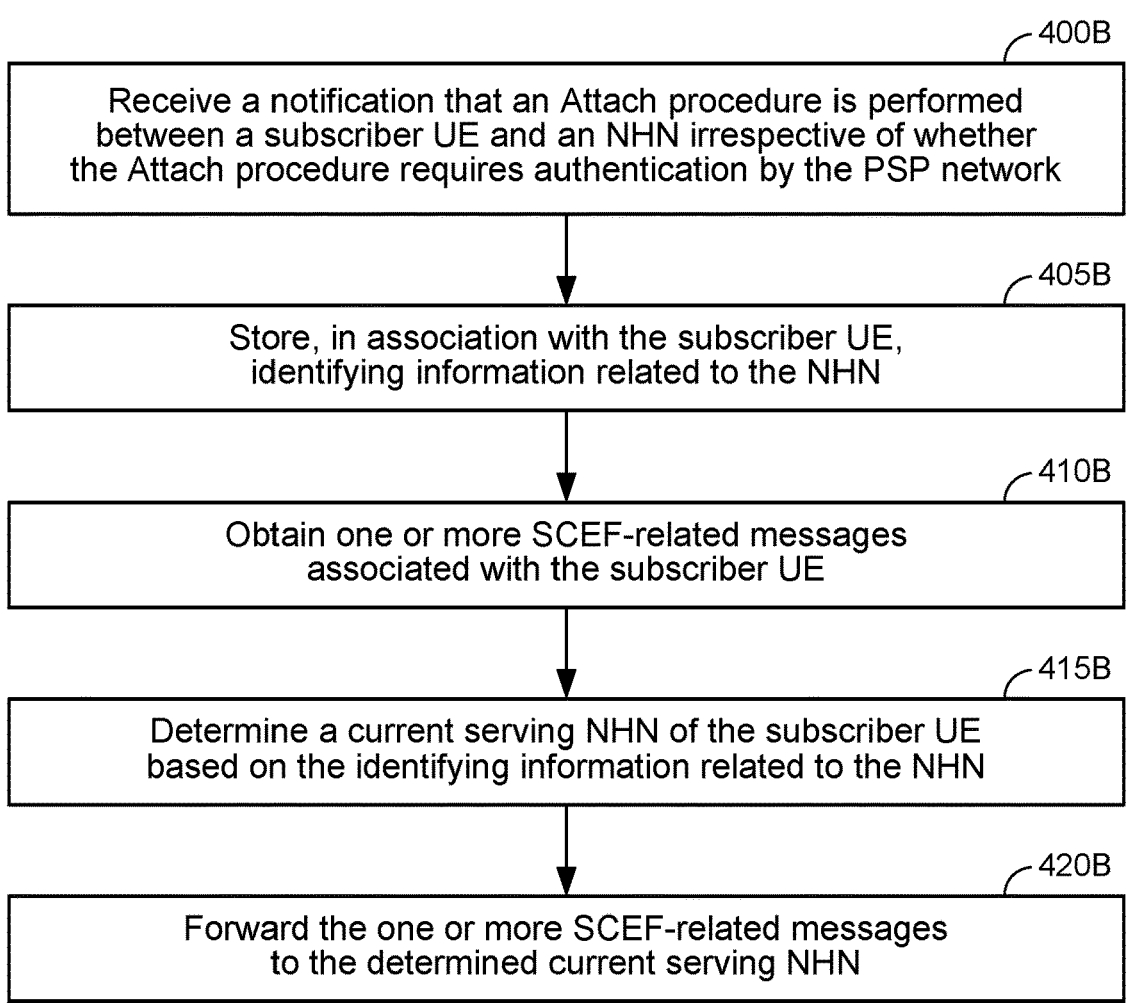
FIG. 4B illustrates a process of determining a current serving NHN of a subscriber UE in accordance with an embodiment of the disclosure.

FIG. 4B illustrates a process of determining a current serving NHN of a subscriber UE in accordance with an embodiment of the disclosure. The process of FIG. 4B is performed by a component of a PSP network (e.g., a PSP AAA or, for an MNO PSP network, an HSS or a combination of the PSP AAA and HSS), which may correspond to either an MNO PSP network or a non-MNO PSP network.

Referring to FIG. 4B, at 400B, the PSP network receives a notification that an Attach procedure is performed between a subscriber UE and an NHN irrespective of whether the Attach procedure requires authentication by the PSP network. In an example, if the notification is received in association with an Authentication procedure, the PSP network may attempt to authenticate the subscriber UE in response to the notification. In another example, if the notification is not received in association with an Authentication procedure, the PSP network need not authenticate the subscriber UE in response to the notification. At 405B, the PSP network stores, in association with the subscriber UE, identifying information related to the NHN. For example, a current serving NHN field in a subscriber UE-associated record may include identifying information for the NHN associated with the notification from 400B. For example, the identifying information related to the NHN may be stored at a PSP AAA or, for an MNO PSP network, an HSS or a combination of the PSP AAA and HSS.

Referring to FIG. 4B, at 410B, the PSP network obtains one or more SCEF-related messages associated with the subscriber UE (e.g., the SCEF-related messages may be targeted to the subscriber UE itself, or alternatively to an NHN component to facilitate the NHN component to initiate SCEF-related actions in association with the subscriber UE). For example, the SCEF-related messages may be obtained at the PSP network from applications 255A, 235B and/or 270B as described above with respect to FIGS. 2A-2B. At 415B, the PSP network determines a current serving NHN of the subscriber UE based on the identifying information related to the NHN, and at 420B, the PSP network forwards the one or more SCEF-related messages to the determined current serving NHN.

Figure 5A:
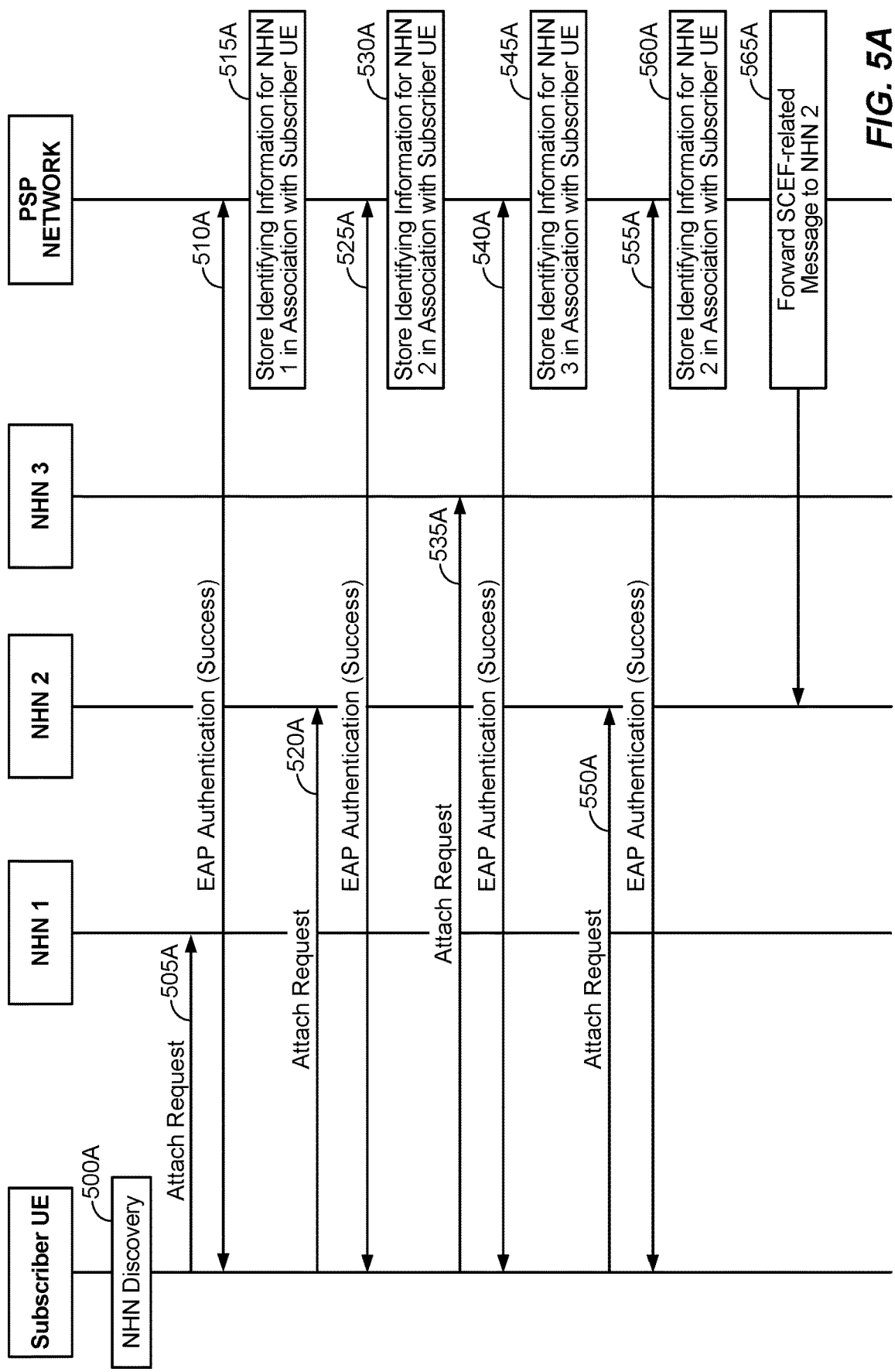
FIGS. 5A-5C illustrate example implementations of the processes of FIGS. 4A-4B in accordance with embodiments of the disclosure.
Figure 5B:
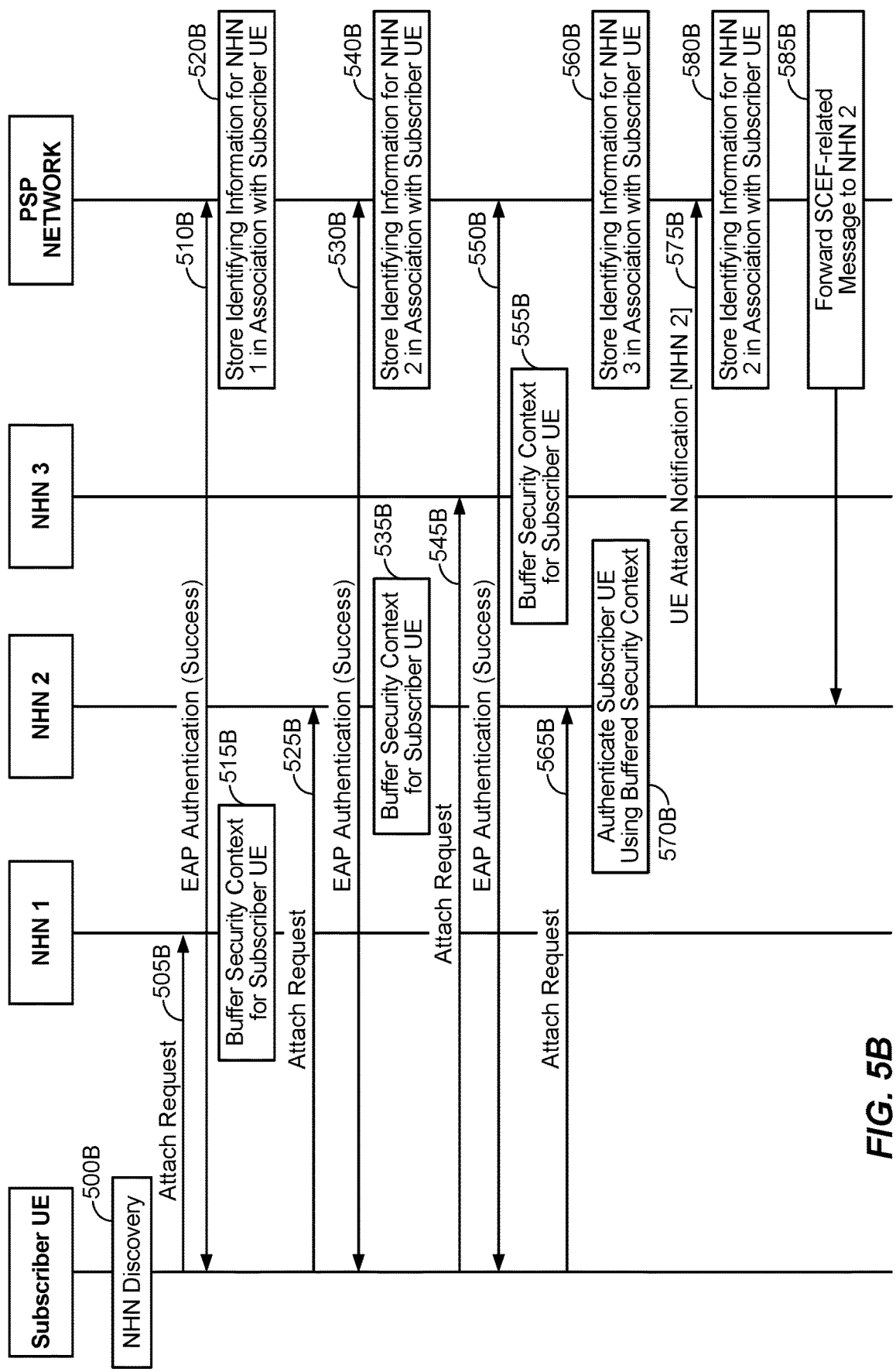
Figure 5C:
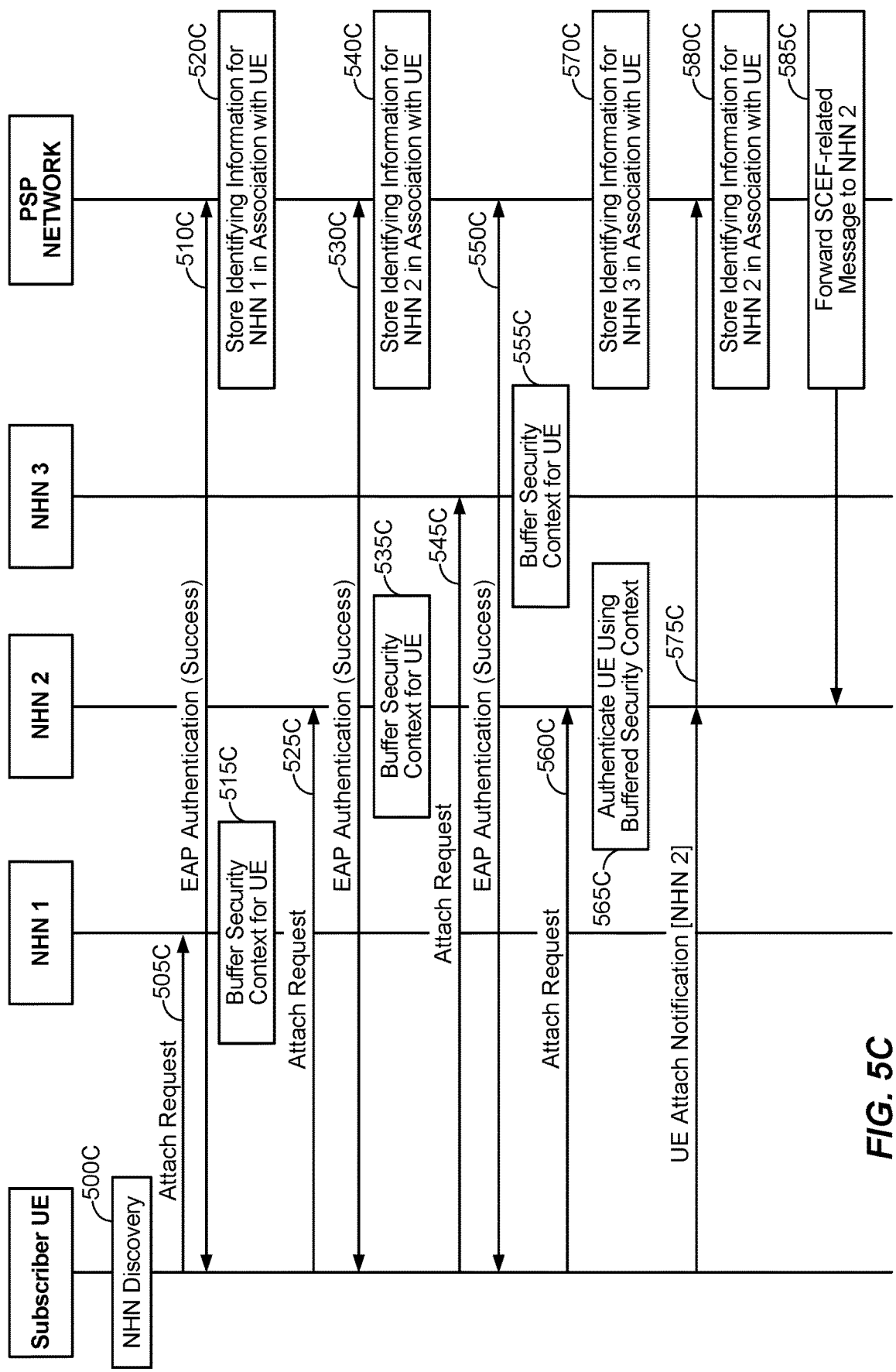

FIGS. 5A-5C illustrate example implementations of the processes of FIGS. 4A-4B in accordance with embodiments of the disclosure.

In the embodiment of FIG. 5A, unlike FIG. 3, an Authentication procedure is required for each Attach procedure, such that security contexts for the subscriber UE need not be buffered by respective NHNs upon attachment. Referring to FIG. 5A, a subscriber UE performs NHN discovery and determines to perform an Attach procedure with respect to NHN 1, 500A. The subscriber UE transmits an Attach request to NHN 1, 505A (e.g., as in 400A of FIG. 4A), after which the subscriber UE is authenticated via an Authentication procedure performed with the PSP network, 510A (e.g., as in 410A of FIG. 4A or 400B of FIG. 4). In an example, the Authentication procedure performed with the PSP network at 510A may occur as a result of a determination that the subscriber UE subscribes to the PSP network (e.g., as in 405A of FIG. 4A). At 515A (e.g., as in 405B of FIG. 4B), the PSP network stores, in association with the subscriber UE, identifying information related to NHN 1.

Referring to FIG. 5A, assume that the subscriber UE determines to attach to NHN 2, and thereby begins an Attach procedure by sending an Attach request to NHN 2, 520A (e.g., as in 400A of FIG. 4A), after which the subscriber UE is authenticated via an Authentication procedure performed with the PSP network, 525A. In an example, the Authentication procedure performed with the PSP network at 525A may occur as a result of a determination that the subscriber UE subscribes to the PSP network (e.g., as in 405A of FIG. 4A). At 530A (e.g., as in 405B of FIG. 4B), the PSP network stores, in association with the subscriber UE, identifying information related to NHN 2. In at least one embodiment, at 530A, the PSP network replaces the identifying information for NHN 1 stored at 515A with the identifying information for NHN 2 based on NHN 2 being the most recent NHN to which the subscriber UE has attached.

Referring to FIG. 5A, assume that the subscriber UE determines to attach to NHN 3, and thereby begins an Attach procedure by sending an Attach request to NHN 3, 535A (e.g., as in 400A of FIG. 4A), after which the subscriber UE is authenticated via an Authentication procedure performed with the PSP network, 540A. In an example, the Authentication procedure performed with the PSP network at 540A may occur as a result of a determination that the subscriber UE subscribes to the PSP network (e.g., as in 405A of FIG. 4A). At 545A (e.g., as in 405B of FIG. 4B), the PSP network stores, in association with the subscriber UE, identifying information related to NHN 3. In at least one embodiment, at 545A, the PSP network replaces the identifying information for NHN 2 stored at 530A with the identifying information for NHN 3 based on NHN 3 being the most recent NHN to which the subscriber UE has attached.

Referring to FIG. 5A, assume the subscriber UE determines to re-attach to NHN 2, and thereby begins an Attach procedure by sending an Attach request to NHN 2, 550A (e.g., as in 400A of FIG. 4A), after which the subscriber UE is authenticated via an Authentication procedure performed with the PSP network, 555A. In an example, the Authentication procedure performed with the PSP network at 555A may occur as a result of a determination that the subscriber UE subscribes to the PSP network (e.g., as in 405A of FIG. 4A). At 560A (e.g., as in 405B of FIG. 4B), the PSP network stores, in association with the subscriber UE, identifying information related to NHN 2. In at least one embodiment, at 560A, the PSP network replaces the identifying information for NHN 3 stored at 545A with the identifying information for NHN 2 based on NHN 2 being the most recent NHN to which the subscriber UE has attached.

As noted above, in the embodiment of FIG. 5A, unlike FIG. 3, an Authentication procedure is required for each Attach procedure, such that a security context for the subscriber UE need not be buffered by NHN 1 after 510A, by NHN 2 after 525A, by NHN 3 after 540A or by NHN 2 after 555A. In this manner, the PSP network can rely upon the required Authentication procedures to more accurately track the current serving NHN of the subscriber UE relative to the process depicted in FIG. 3 where the PSP network is bypassed in scenarios where a non-expired buffered security context is available for authenticating a subscriber UE in association with NHN re-attachment. At 565A (e.g., as in 410B-420B of FIG. 4B), the PSP network obtains an SCEF-related message, determines the current serving NHN of the subscriber UE to be NHN 2 (e.g., based on 560A), and forwards the SCEF-related message to NHN 2.

In the embodiments of FIGS. 5B-5C, instead of requiring an Authentication procedure to be performed in association with each Attach procedure as in FIG. 5A, the NHN (in FIG. 5B) or the subscriber UE (in FIG. 5C) instead sends a proprietary notification to the PSP network for each Attach procedure where PSP network-based authentication is not required.

Referring to FIG. 5B, a subscriber UE performs NHN discovery and determines to perform an Attach procedure with respect to NHN 1, 500B. The subscriber UE transmits an Attach request to NHN 1, 505B (e.g., as in 400A of FIG. 4A), after which the subscriber UE is authenticated via an Authentication procedure performed with the PSP network, 510B (e.g., as in 410A of FIG. 4A or 400B of FIG. 4B). In an example, the Authentication procedure performed with the PSP network at 510B may occur as a result of a determination that the subscriber UE subscribes to the PSP network (e.g., as in 405A of FIG. 4A). Once the subscriber UE is authenticated at 510B, NHN 1 buffers a security context for the subscriber UE, 515B. At 520B (e.g., as in 405B of FIG. 4B), the PSP network stores, in association with the subscriber UE, identifying information related to NHN 1.

Referring to FIG. 5B, assume that the subscriber UE determines to attach to NHN 2, and thereby begins an Attach procedure by sending an Attach request to NHN 2, 525B (e.g., as in 400A of FIG. 4A), after which the subscriber UE is authenticated via an Authentication procedure performed with the PSP network, 530B. In an example, the Authentication procedure performed with the PSP network at 530B may occur as a result of a determination that the subscriber UE subscribes to the PSP network (e.g., as in 405A of FIG. 4A). Once the subscriber UE is authenticated at 530B, NHN 2 buffers a security context for the subscriber UE, 535B. At 540B (e.g., as in 405B of FIG. 4B), the PSP network stores, in association with the subscriber UE, identifying information related to NHN 2. In at least one embodiment, at 540B, the PSP network replaces the identifying information for NHN 1 stored at 520B with the identifying information for NHN 2 based on NHN 2 being the most recent NHN to which the subscriber UE has attached.

Referring to FIG. 5B, assume that the subscriber UE determines to attach to NHN 3, and thereby begins an Attach procedure by sending an Attach request to NHN 3, 545B (e.g., as in 400A of FIG. 4A), after which the subscriber UE is authenticated via an Authentication procedure performed with the PSP network, 550B. In an example, the Authentication procedure performed with the PSP network at 550B may occur as a result of a determination that the subscriber UE subscribes to the PSP network (e.g., as in 405A of FIG. 4A). Once the subscriber UE is authenticated at 550B, NHN 3 buffers a security context for the subscriber UE, 555B. At 560B (e.g., as in 405B of FIG. 4B), the PSP network stores, in association with the subscriber UE, identifying information related to NHN 3. In at least one embodiment, at 560B, the PSP network replaces the identifying information for NHN 2 stored at 540B with the identifying information for NHN 3 based on NHN 3 being the most recent NHN to which the subscriber UE has attached.

Referring to FIG. 5B, assume the subscriber UE determines to re-attach to NHN 2, and thereby begins an Attach procedure by sending an Attach request to NHN 2, 565B (e.g., as in 400A of FIG. 4A). In this case, assume that the buffered security context from 535B has not yet expired. Accordingly, at 570B, NHN 2 authenticates the subscriber UE using the buffered security context.

At this point, in contrast to FIG. 3, at 575B, NHN 2 transmits a UE Attach Notification to the PSP network, 575B. The UE Attach Notification conveys the subscriber UE's re-attachment to NHN 2 to the PSP network. In an example, the PSP network to which the UE Attach Notification is sent at 575B may be determined based on a determination that the subscriber UE subscribes to the PSP network (e.g., as in 405A of FIG. 4A). Accordingly, in response to the UE Attach Notification of 575B, at 580B (e.g., as in 405B of FIG. 4B), the PSP network stores, in association with the subscriber UE, identifying information related to NHN 2. In at least one embodiment, at 580B, the PSP network replaces the identifying information for NHN 3 stored at 560B with the identifying information for NHN 2 based on NHN 2 being the most recent NHN to which the subscriber UE has attached. In this manner, the PSP network can rely upon the supplemental UE Attach Notifications to more accurately track the current serving NHN of the subscriber UE relative to the process depicted in FIG. 3 where the PSP network is bypassed in scenarios where a non-expired buffered security context is available for authenticating a subscriber UE in association with NHN re-attachment. At 585B (e.g., as in 410B-420B of FIG. 4B), the PSP network obtains an SCEF-related message, determines the current serving NHN of the subscriber UE to be NHN 2 (e.g., based on 580B), and forwards the SCEF-related message to NHN 2. While not illustrated expressly in FIG. 5B, additional UE Attach Notifications and/or Authentication procedures may occur, which may cause the PSP network to update the NHN identifying information stored in association with the subscriber UE, and thereby change the target NHN for forwarding of subsequent SCEF-related messages.

FIG. 5C is substantially similar to FIG. 5B, except that the subscriber UE is the device that sends the UE Attach Notification to the PSP network in FIG. 5C, in contrast to the NHN as in FIG. 5B. Accordingly, 500C-585C substantially correspond to 500B-585B of FIG. 5B, except for the subscriber UE transmitting the UE Attach Notification at 575C. FIG. 5C will thereby not be discussed further for the sake of brevity.

Further, while the UE Attach Notifications in FIGS. 5B-5C are sent only when a buffered security context is used for authentication in context with NHN re-attachment, in other embodiments the UE Attach Notifications can be sent more frequently (e.g., for each Attach procedure, even though this may be somewhat redundant because the PSP network will be notified of the Attach procedure by virtue of PSP network involvement with an associated Authentication procedure). Further, the processes of FIGS. 5A-5C are not mutually exclusive, and could theoretically be used together (e.g., the authenticate for each Attach procedure rule from FIG. 5A could be combined with proprietary UE Attach Notifications as in FIGS. 5B-5C, the UE Attach Notifications in FIGS. 5B-5C could be sent redundantly by both the subscriber UE and the NHN, etc.).

Figure 6:
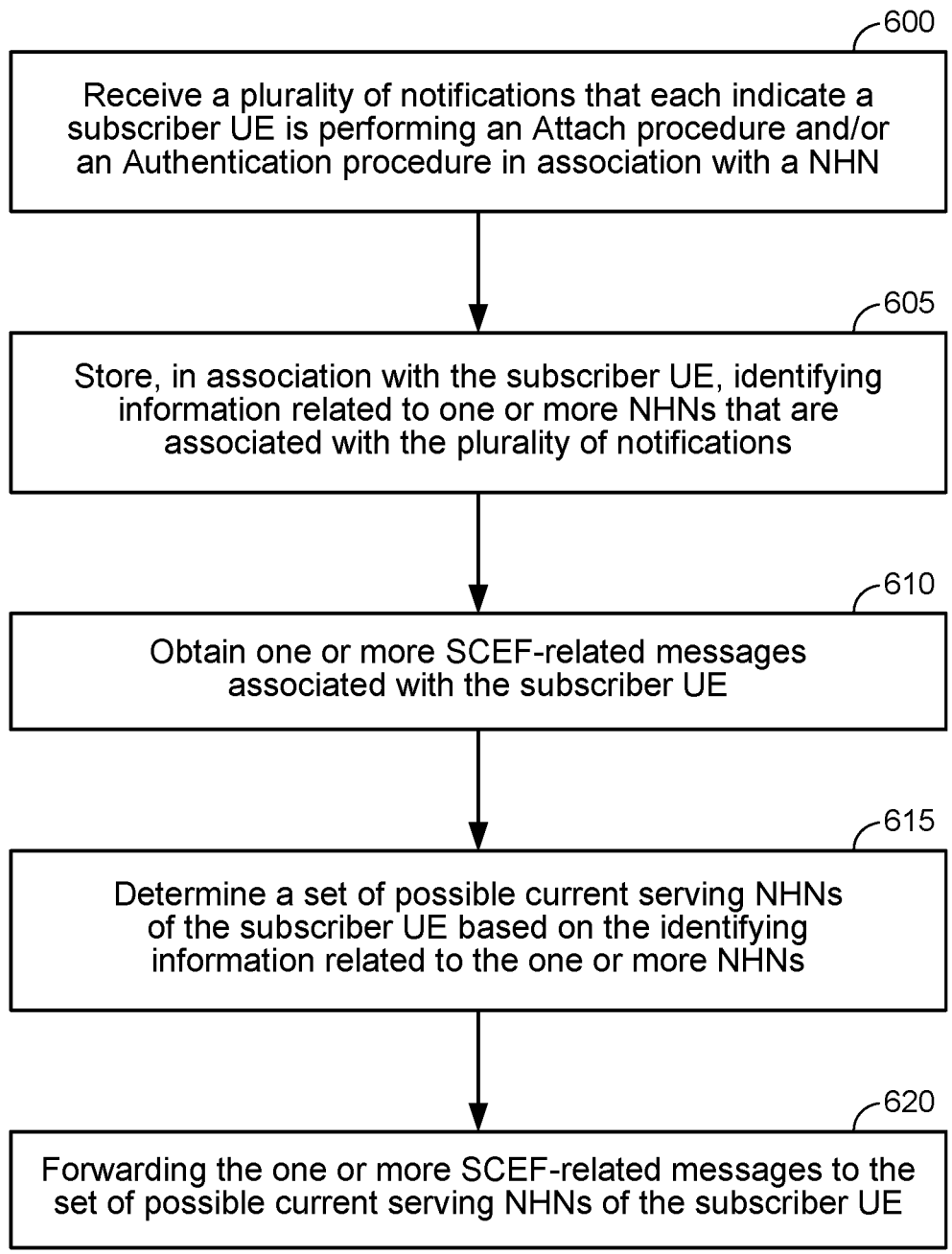
FIG. 6 illustrates a process of determining a set of possible current serving NHNs of a UE in accordance with an embodiment of the disclosure.

FIG. 6 illustrates a process of determining a set of possible current serving NHNs of a UE in accordance with an embodiment of the disclosure. The process of FIG. 6 is performed by a component of a PSP network (e.g., a PSP AAA), which may correspond to either an MNO PSP network or a non-MNO PSP network. In an example, the process of FIG. 6 can be performed at the PSP network in conjunction with subscriber UE and NHN operation as described above with respect to FIG. 3. Accordingly, the UE Attach Notification enhancements described above with respect to FIGS. 4A-5C are not expressly required in association with FIG. 6, although such an implementation is possible.

Referring to FIG. 6, at 600, the PSP network receives a plurality of notifications that each indicate a subscriber UE is performing an Attach procedure and/or an Authentication procedure in association with a NHN. The plurality of notifications may be triggered in association with Attach procedures that require an Authentication procedure (e.g., no buffered security context available for authentication at NHN), Attach procedures that do not require an Authentication procedure (e.g., UE Attach Notifications sent when buffered security context is available for authentication at NHN) or Authentication procedures that are not involved with an associated Attach procedure (e.g., periodic Authentication procedure to confirm that UE already attached to a particular NHN remains authenticated).

Referring to FIG. 6, at 605, the PSP network stores, in association with the subscriber UE, identifying information related to one or more NHNs that are associated with the plurality of notifications. In an example, the one or more NHNs can include multiple (e.g., two or more) NHNs. In one embodiment, identifying information may be stored for NHNs associated with the N previous notifications. Accordingly, if N=3 and the subscriber UE attaches to NHN 1, then NHN 2, and then NHN 3, identifying information for each of NHNs 1, 2 and 3 may be stored at 605. In another example, if N=4 and the subscriber UE attaches to NHN 1, then NHN 2, then NHN 3, and then re-attaches NHN 2, identifying information for each of NHNs 1, 2 and 3 may be stored at 605 (e.g., the number of NHNs for which identifying information is stored need not correspond to the number of notifications received at least in part due to NHN re-attachments).

In another embodiment, identifying information may be stored for the N NHNs associated with the notifications (e.g., such that identifying information for a particular target number of NHNs is maintained, even if NHN re-attachments have occurred). So, if N=2 and the subscriber UE attaches to NHN 1, then NHN 2, then NHN 3, and then re-attaches NHN 1, identifying information for each of NHNs 1 and 3 may be stored at 605.

In yet another example, identifying information may be stored for NHNs associated with the most recent notifications received at the PSP network. For example, an age threshold can be established, and NHN-identifying information associated with notifications older than the age threshold will be discarded. In scenarios where the age threshold is used, each the identifying information for each NHN may be stored in association with a timestamp for a corresponding notification. In an example, the age threshold may be established based on the expiration period for buffered security contexts that is used by NHNs. For example, by setting the age threshold based on the expiration period for buffered security contexts that is used by NHNs, the PSP network can be configured to track NHN-identifying information only for NHNs that would not necessarily perform an Authentication procedure in the event of an Attach procedure with the subscriber UE (e.g., due to the likelihood that these NHNs would use a buffered security context for authentication).

Referring to FIG. 6, at 610, the PSP network obtains one or more SCEF-related messages associated with the subscriber UE (e.g., targeted to the subscriber UE, or alternatively targeted to an NHN component to initiate SCEF-related action with respect to the subscriber UE). For example, the SCEF-related messages may be obtained at the PSP network from applications 255A, 235B and/or 270B as described above with respect to FIGS. 2A-2B. At 615, the PSP network determines a set of possible current serving NHNs of the subscriber UE based on the identifying information related to the one or more NHNs. In an example, the set of possible current serving NHNs may simply correspond to the NHNs for which identifying information is stored when the one or more SCEF-related messages are obtained at 610. As noted above, the NHN-identifying information stored at 605 may be updated based on one or more rules (e.g., only store NHN-identifying information for previous N notifications or for N NHNs, only store NHN-identifying information for notifications that do not exceed age threshold, etc.). However, these rules need not be implemented in association with the storing of 605, and can instead be implemented as part of 615. So, at 605, the PSP network can simply store NHN-identifying information for all NHNs for which notifications are received at 600. In this case, the stored NHN-identifying information can be filtered to produce the set of possible current serving NHNs at 615 (e.g., using any of the rules noted above with respect to 605 in terms of storing filters). So, at 615, the PSP network may exclude, from the set of possible current serving NHNs, NHNs with a most recent notification that exceeds the age threshold, or would push the set of possible current serving NHNs above an NHN threshold, and so on. At 620, the PSP network forwards the one or more SCEF-related messages to each NHN in the set of possible current serving NHNs of the subscriber UE. As will be appreciated, the subscriber UE may only be attached to one of these NHNs, so not all of the forwarded SCEF-related messages will necessarily result in delivery success (e.g., because an older NHN to which the subscriber UE is no longer attached may not be able to find the subscriber UE).

Figure 7:
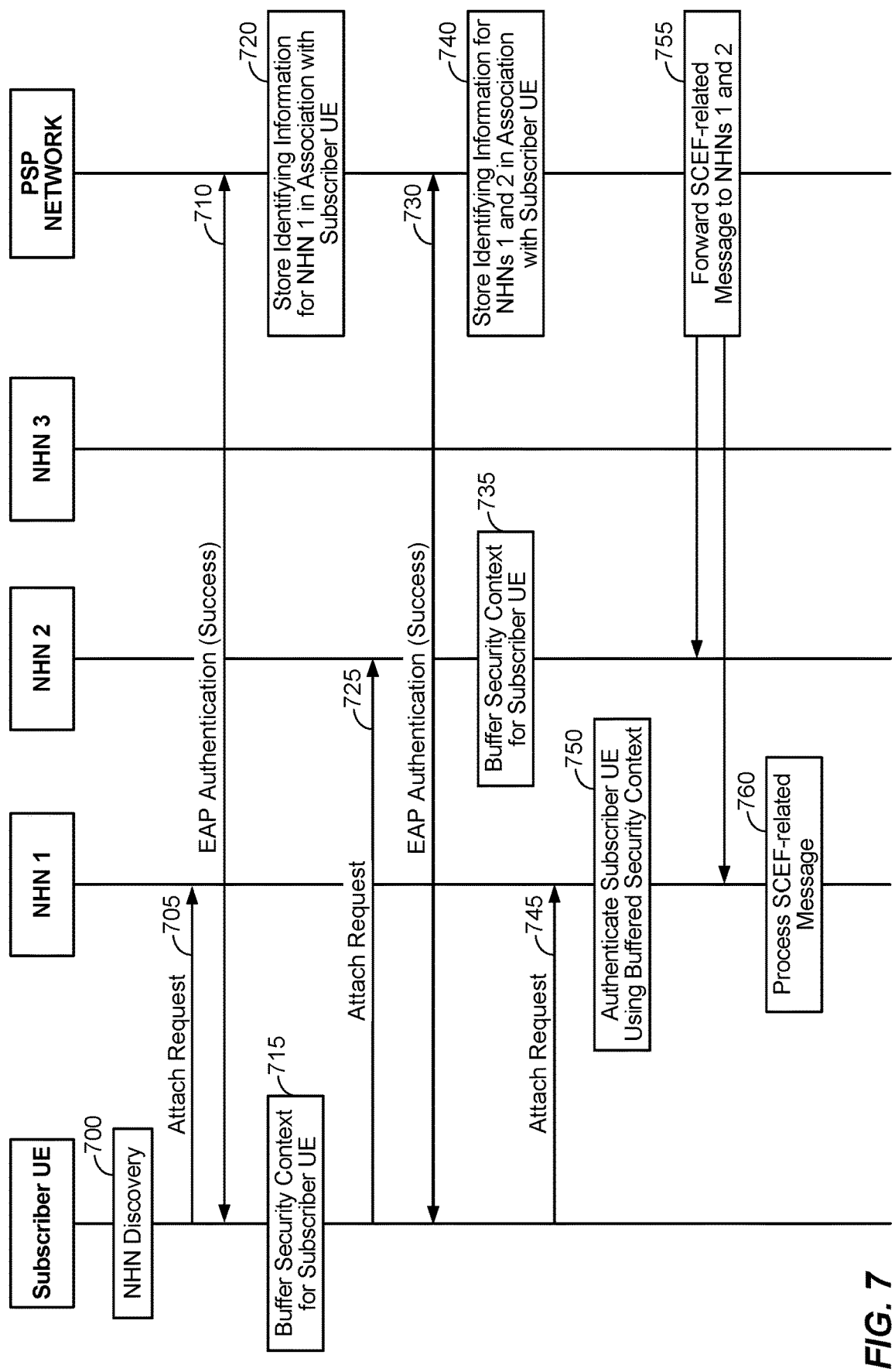
FIG. 7 illustrates an example implementation of the process of FIG. 6 in accordance with an embodiment of the disclosure.

FIG. 7 illustrates an example implementation of the process of FIG. 6 in accordance with an embodiment of the disclosure. Referring to FIG. 7, a subscriber UE performs NHN discovery and determines to perform an Attach procedure with respect to NHN 1, 700. The subscriber UE transmits an Attach request to NHN 1, 705, after which the subscriber UE is authenticated via an Authentication procedure performed with the PSP network, 710. In this case, the Authentication procedure at 710 is an example of one of the notifications received by the PSP network at 600 of FIG. 6. Once the subscriber UE is authenticated at 710, NHN 1 buffers a security context for the subscriber UE, 715. At 720 (e.g., as in 605 of FIG. 6), the PSP network stores, in association with the subscriber UE, identifying information related to NHN 1.

Referring to FIG. 7, assume that the subscriber UE determines to attach to NHN 2, and thereby begins an Attach procedure by sending an Attach request to NHN 2, 725, after which the subscriber UE is authenticated via an Authentication procedure performed with the PSP network, 730. In this case, the Authentication procedure at 730 is an example of one of the notifications received by the PSP network at 600 of FIG. 6. Once the subscriber UE is authenticated at 730, NHN 2 buffers a security context for the subscriber UE, 735. At 740 (e.g., as in 605 of FIG. 6), the PSP network stores, in association with the subscriber UE, identifying information related to NHN 2. Instead of replacing the identifying information for NHN 1 stored at 720 with the identifying information for NHN 2 based on NHN 2 being the most recent NHN to which the subscriber UE has attached (e.g., as in 540B of FIG. 5B), the PSP network instead stores identifying information for both NHNs 1 and 2 at 740.

Referring to FIG. 7, assume the subscriber UE determines to re-attach to NHN 1, and thereby begins an Attach procedure by sending an Attach request to NHN 1, 745. In this case, assume that the buffered security context from 715 has not yet expired. Accordingly, at 750, NHN 1 authenticates the subscriber UE using the buffered security context.

At this point, the PSP network is not actually aware that the subscriber UE has re-attached to NHN 1. However, the identifying information for NHN 1 is still stored at the PSP network in association with the subscriber UE based on the earlier Authentication procedure in context with the subscriber UE's attachment to NHN 1 from 710. At 755 (e.g., as in 610-620 of FIG. 6), the PSP network obtains an SCEF-related message, determines the set of possible current serving NHNs as NHNs 1+2 (e.g., based on 740), and forwards the SCEF-related message to both NHNs 1 and 2. In this embodiment, NHN 2 does not successfully process the SCEF-related message because the subscriber UE is no longer attached to NHN 2. However, NHN 1 is able to successfully process the SCEF-related message at 760 because NHN 1 is the current serving NHN for the subscriber UE. In an example, the processing of the SCEF-related message at 760 may include transporting the SCEF-related message to a target entity (e.g., the subscriber UE or an NHN component), which then initiates some SCEF-related action. As will be appreciated, by tracking UE-NHN associations across multiple notifications associated with Attach and/or Notification procedures, the PSP network need not perfectly track the current serving NHN of the subscriber UE in order to route SCEF-related messages to the appropriate NHN for processing.

While FIGS. 3-7 focus on various methodologies by which a current serving NHN of a subscriber UE or a set of possible current serving NHNs of the subscriber UE can be conveyed to, and tracked by, the PSP network, another difficulty associated with extending support for SCEF to NHNs relates to conveying proper identifiers as SCEF-related messages are routed between NHNs, non-MNO PSP networks and external applications.

For example, in 3GPP Release 13+, an external identifier for a subscriber UE (or "external subscriber identifier") may be assigned on an application-specific basis. NHNs use an internal identifier for each subscriber UE, such as a Pseudo International Mobile Subscriber Identity (P-IMSI) specified by MulteFire Alliance. The NHNs may not be aware of the application-specific external subscriber identifier for the subscriber UE, and may thereby not be able to process an incoming message associated with the application-specific external identifier for the subscriber UE appropriately.

Consider the scenario where an SCEF at a PSP network receives an SCEF-related message (e.g., configuring the subscriber UE for Monitoring Events feature) that is associated with (e.g., addressed to the subscriber UE and/or addressed to an NHN component to facilitate the NHN component to initiate some action on behalf of the subscriber UE) the application-specific external subscriber identifier for the subscriber UE. If the PSP network is an MNO PSP network, the MNO PSP network can lookup the internal identifier (e.g., via the HSS) used inside a current serving NHN of the subscriber UE. Thereby, the MNO PSP network may associate the SCEF-related message forwarded to the current serving NHN of the subscriber UE with the subscriber UE's internal identifier (e.g., P-IMSI) instead of the application-specific external subscriber identifier for the subscriber UE.

However, non-MNO PSP networks are not provisioned with an HSS and do not know the internal identifiers used by the subscriber UEs inside respective NHNs. If these non-MNO PSP networks forward the SCEF-related messages to NHNs in association with application-specific external subscriber identifiers for target subscriber UEs instead of respective internal identifiers, the NHNs will not recognize the application-specific external subscriber identifiers and will not be able to process the SCEF-related messages correctly.

Embodiments of the disclosure are related to establishing "intermediate" subscriber identifiers that are configured to uniquely identify subscriber UEs on an interface between a non-MNO PSP network and an NHN. As will be described below, the non-MNO PSP network maintains a table that maps application-specific external subscriber identifiers to corresponding intermediate subscriber identifiers, while one or more NHNs maintain a table that maps intermediate subscriber identifiers to corresponding internal identifier (e.g., P-IMSIs). SCEF-related messages exchanged over an interface between the non-MNO PSP network and the NHN(s) are modified so as to be associated with the intermediate subscriber identifier, as will be discussed below in more detail.

Figure 8:
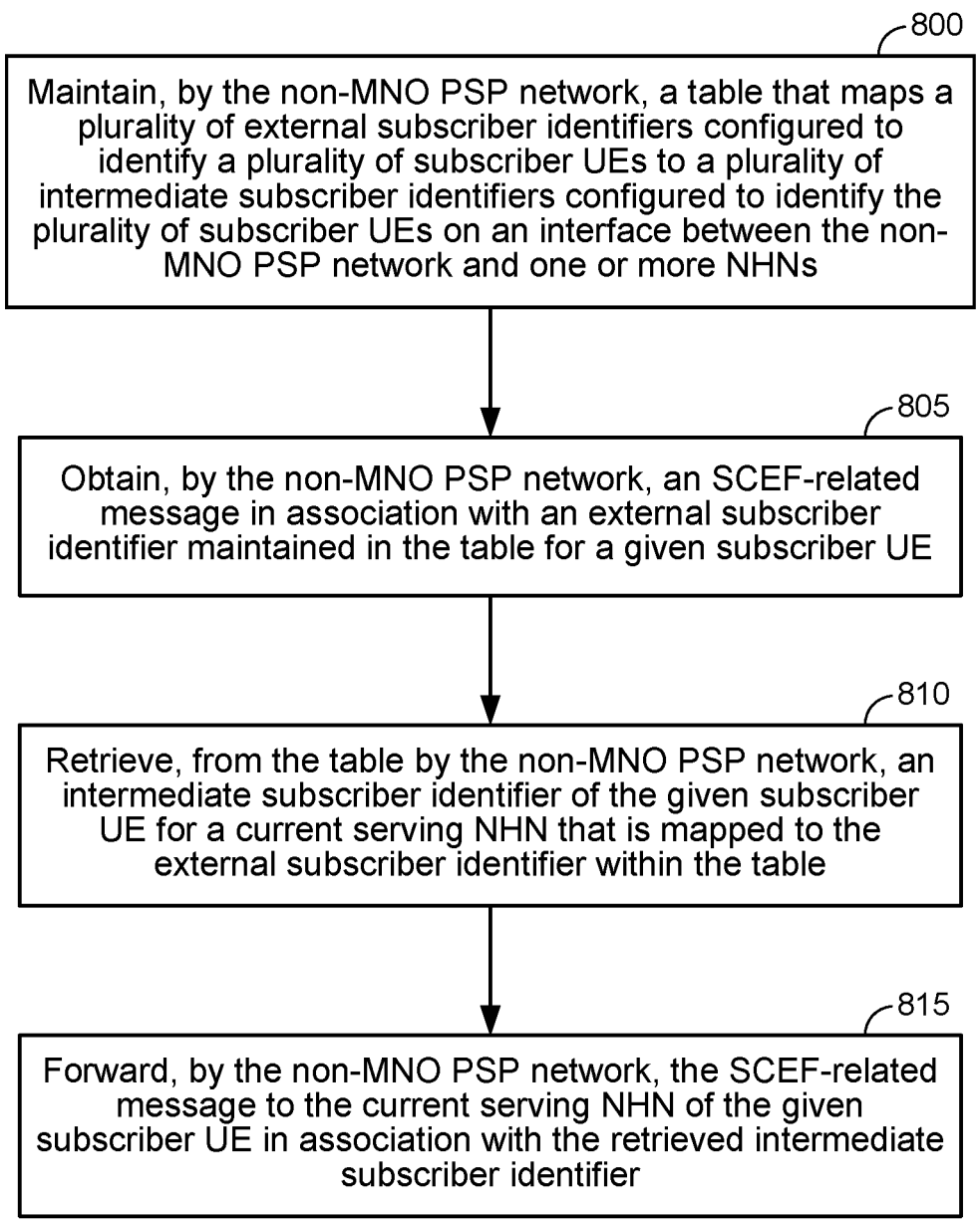
FIG. 8 illustrates a process of transporting a Service Capability Exposure Function (SCEF)-related message in accordance with an embodiment of the disclosure.

FIG. 8 illustrates a process of transporting an SCEF-related message in accordance with an embodiment of the disclosure. The process of FIG. 8 may be performed at a component of a non-MNO PSP network, such as the SCEF 275B described above with respect to FIG. 2B.

Referring to FIG. 8, at 800, the non-MNO PSP network maintains a table that maps a plurality of external subscriber identifiers configured to identify a plurality of subscriber UEs to a plurality of intermediate subscriber identifiers configured to identify the plurality of subscriber UEs on an interface between the non-MNO PSP network and one or more NHNs. In an example, the plurality of external subscriber identifiers may be assigned by one or more external applications (e.g., applications 270B of FIG. 2B). In another example, the plurality of intermediate subscriber identifiers (which may alternatively be referred to as Neutral Host Subscriber Identifiers) may be established via negotiation between the non-MNO PSP network and the one or more NHNs.

Still referring to 800 of FIG. 8, one or more of the plurality of subscriber UEs may be associated with multiple external subscriber identifiers (e.g., which may be assigned to the respective subscriber UEs by different external applications). In this case, each of the multiple external subscriber identifiers for a particular subscriber UE may be mapped to a shared intermediate subscriber identifier for a particular NHN, although different intermediate subscriber identifiers may still be used for different NHNs. Accordingly, one or more of the plurality of subscriber UEs may be associated with different intermediate subscriber identifiers for different NHNs (e.g., such that the same external subscriber identifier is mapped to different intermediate subscriber identifiers for different NHNs), although it is possible that the same intermediate subscriber identifier is used for a particular subscriber UE across multiple NHNs (e.g., may not be possible if a particular NHN has already assigned that intermediate subscriber identifier to another subscriber UE).

Referring to FIG. 8, at 805, the non-MNO PSP network obtaining obtains an SCEF-related message that is associated with an external subscriber identifier maintained in the table for a given subscriber UE. For example, at 805, the SCEF-related message may be received at the SCEF 275B from one of the applications 270B. In an example, the SCEF-related message may be associated with the external subscriber identifier by being addressed to the external subscriber identifier (i.e., targeted to the given subscriber UE itself), or alternatively by including some reference to the external subscriber identifier (e.g., the SCEF-related message is targeted to an NHN component to facilitate the NHN component to initiate some type of SCEF-related action for the given subscriber UE).

Referring to FIG. 8, at 810, the non-MNO PSP network retrieves, from the table, an intermediate subscriber identifier for a current serving NHN of the given subscriber UE that is mapped to the external subscriber identifier within the table. In an example, the non-MNO PSP network may attempt to identify a current serving NHN (or set of possible current serving NHNs) so as to retrieve the intermediate subscriber identifier(s) for those particular NHN(s) at 810, as described above with respect to FIGS. 4A-7.

Referring to FIG. 8, at 815, the non-MNO PSP network forwards the SCEF-related message to the current serving NHN of the given subscriber UE in association with the retrieved intermediate subscriber identifier. As noted above, the forwarding of 815 may be based on tracking of the current serving NHN of the given subscriber UE (e.g., see FIGS. 4A-5C), or alternatively the forwarding of 815 may occur based on the current serving NHN for the given subscriber UE being among a set of possible current serving NHNs that are each sent the SCEF-related message at 815 (e.g., see FIGS. 6-7).

Figure 9:
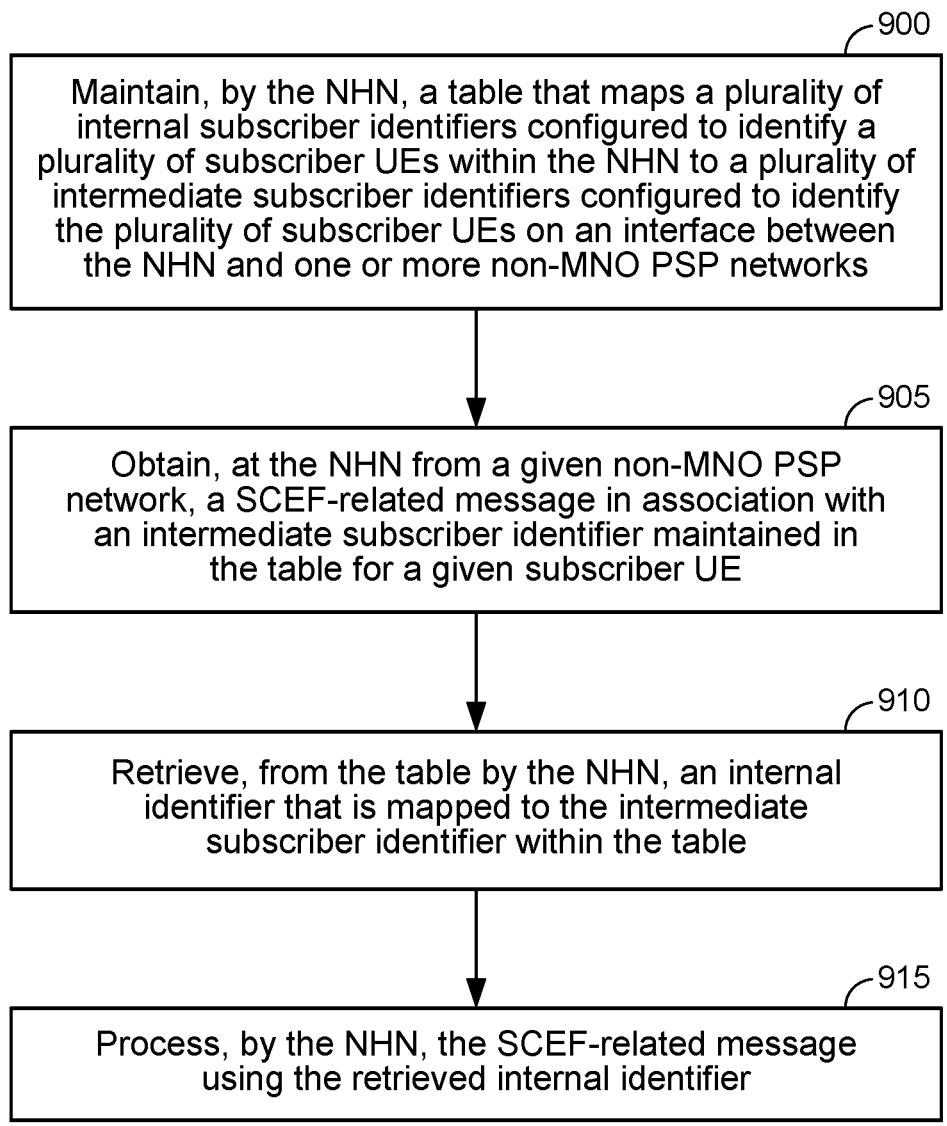
FIG. 9 illustrates a process of transporting an SCEF-related message in accordance with another embodiment of the disclosure.

FIG. 9 illustrates a process of transporting an SCEF-related message in accordance with another embodiment of the disclosure. The process of FIG. 9 may be performed at a component of an NHN, such as the NH-MME 225A, the NH-GW 230A, IWK-SCEFs 235A, 205B or 220B, the local AAA proxies 240A, 210B or 225B, and so on, as described above with respect to FIGS. 2A-2B.

Referring to FIG. 9, at 900, the NHN maintains a table that maps a plurality of internal identifiers configured to identify a plurality of subscriber UEs within the NHN to a plurality of intermediate subscriber identifiers configured to identify the plurality of subscriber UEs on an interface between the NHN and one or more non-MNO PSP networks. In an example, the plurality of internal identifiers may be P-IMSIs for the plurality of subscriber UEs. In another example, the plurality of intermediate subscriber identifiers (which may alternatively be referred to as Neutral Host Subscriber Identifiers) may be established via negotiation between the NHN and one or more non-MNO PSP networks.

Still referring to 900 of FIG. 9, one or more of the plurality of subscriber UEs may be associated with different intermediate subscriber identifiers for different non-MNO PSP networks. Alternatively, it is possible that the same intermediate subscriber identifier is used for a particular subscriber UE across multiple non-MNO PSP networks (e.g., may not be possible if a particular non-MNO PSP network has already assigned that intermediate subscriber identifier to another subscriber UE).

Referring to FIG. 9, at 905, the NHN receives, from a given non-MNO PSP network, an SCEF-related message in association with an intermediate subscriber identifier maintained in the table for a given subscriber UE. For example, at 905, the SCEF-related message may be received at one of the IWK-SCEFs 235A, 205B or 220B as described above with respect to FIGS. 2A-2B. In another example, at 905, the SCEF-related message may be received at another NHN component (e.g., the NH-GW 230A, local AAA proxy 240A, 210B or 225B, etc.) as described above with respect to FIG. 2A.

Referring to 905 of FIG. 9, in one example, the IWK-SCEFs or local AAA proxies may be configured to receive the SCEF-related message which includes the intermediate subscriber identifier, and then translate the SCEF-related message by swapping out the intermediate subscriber identifier for a corresponding internal identifier used for the given subscriber UE inside of the NHN. In this case, the IWK-SCEF or local AAA proxy receives the SCEF-related message in association to the intermediate subscriber identifier, while the remaining NHN components only receive the SCEF-related message in association with the internal identifier. Thus, in this example, the IWK-SCEF or local AAA proxy performs the process of FIG. 9, whereas the remaining NHN components process the SCEF-related message without regard to the intermediate subscriber identifier.

Referring to 905 of FIG. 9, in another example, the SCEF-related message may be transported between NHN components in association with (or containing) the intermediate subscriber identifier. In this case, the IWK-SCEF or local AAA proxy need not swap out the intermediate subscriber identifier for a corresponding internal identifier used for the given subscriber UE inside of the NHN, but rather transports the SCEF-related message through the NHN intact with the intermediate subscriber identifier. In a further example, transporting the SCEF-related message through the NHN intact with the intermediate subscriber identifier may be possible based on each NHN component handling the SCEF-related message maintaining its own identifier mapping table. In other words, in this particular example, each NHN component handling the SCEF-related message that is exchanged with the intermediate subscriber identifier would independently maintain the identifier mapping table described above with respect to 900 of FIG. 9. Moreover, in this particular example, each NHN component handling the SCEF-related message that is exchanged with the intermediate subscriber identifier would independently be performing the entirety of the process of FIG. 9, as will be described below in more detail.

At 910, the NHN retrieves, from the table, an internal identifier that is mapped to the intermediate subscriber identifier within the table. At 915, the NHN processes the SCEF-related message using the retrieved internal identifier. For example, if the SCEF-related message is targeted to the given subscriber UE itself, the processing at 915 may include the IWK-SCEF 235A or local AAA proxy 240A modifying the SCEF-related message to set a destination address to the internal identifier (e.g., P-IMSI) for the given subscriber UE, and then forwarding the modified SCEF-related message to the NH-MME 225A for delivery to the given subscriber UE. In an alternative example, if the SCEF-related message is targeted to an NHN component to facilitate the NHN component to initiate some type of SCEF-related action for the given subscriber UE, the processing at 915 may include transporting of the SCEF-related message to the NHN component (e.g., NH-MME) where the SCEF-related message is then processed (e.g., carried out or acted upon).

In yet another alternative example of 915 of FIG. 9, as noted above, the process of FIG. 9 may execute independently at various NHN components, and not merely the IWK-SCEF or local AAA proxy. Some of these NHN components (e.g., NH-GW 230A, etc.) may perform an intermediate subscriber identifier-based transport function. So, the internal identifier may be retrieved at 910 of FIG. 9 to identify the given subscriber UE, the NHN component figures out how to route the SCEF-related message using the retrieved internal identifier as part of the processing at block 915, after which the NHN component forwards the SCEF-related message to another NHN component using the intermediate subscriber identifier.

In yet another alternative example of 915 of FIG. 9, the NHN component performing the process may be the target NHN component to which the SCEF-related message is transmitted. In this case, the internal identifier may be retrieved at 910 of FIG. 9 to identify the given subscriber UE, and the NHN component performs an SCEF-related action for the given subscriber UE in response to the SCEF-related message using the retrieved internal identifier as part of the processing at block 915.

While FIGS. 8-9 relate to transporting an SCEF-related message from an external application to a target NHN, an SCEF-related message may also be transported from the NHN back to the external application, as will be described below with respect to FIGS. 10-11.

Figure 10:
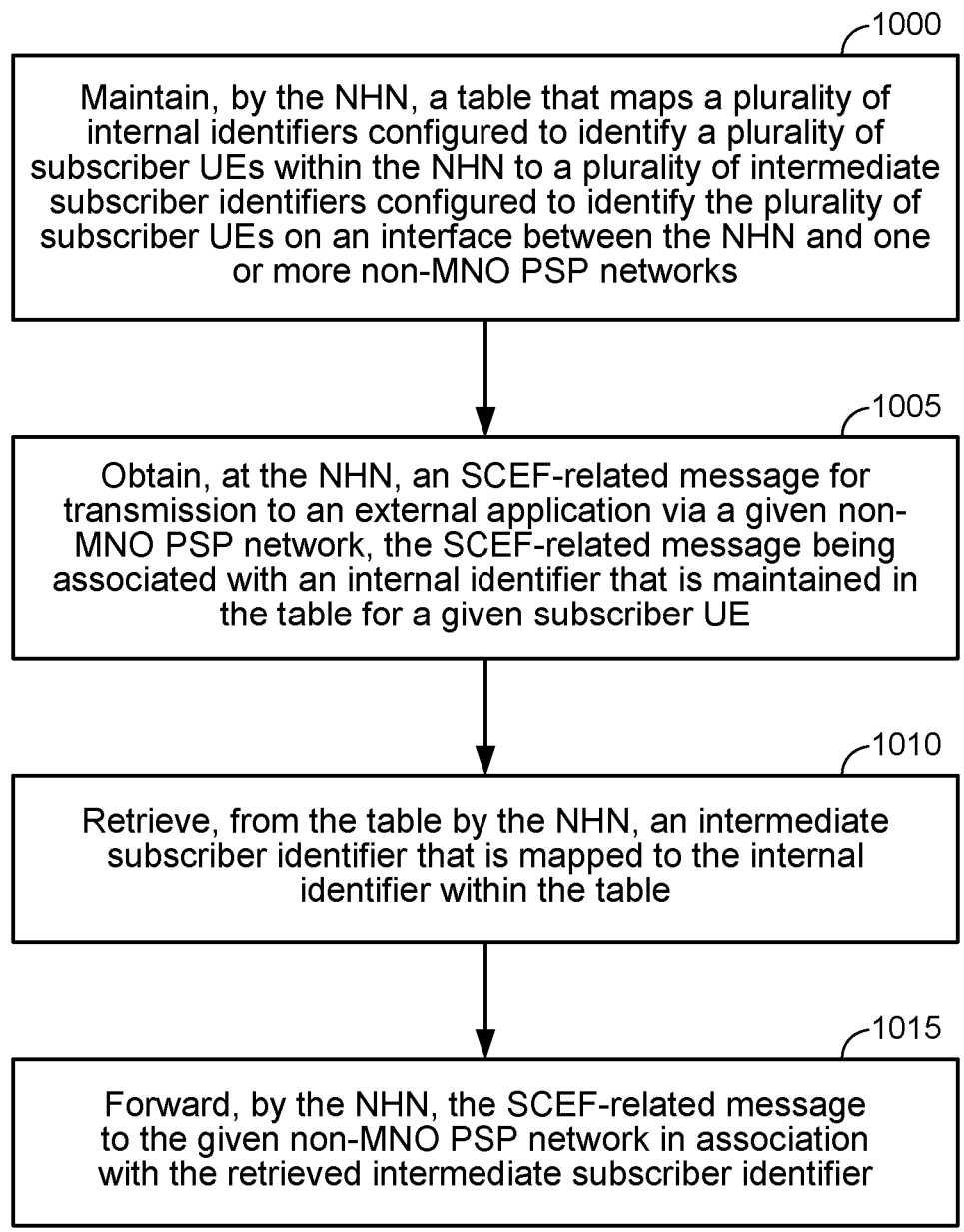
FIG. 10 illustrates a process of transporting an SCEF-related message in accordance with another embodiment of the disclosure.

FIG. 10 illustrates a process of transporting an SCEF-related message in accordance with another embodiment of the disclosure. The process of FIG. 10 may be performed at a component of an NHN, such as the NH-MME 225A, the NH-GW 230A, IWK-SCEFs 235A, 205B or 220B, the local AAA proxies 240A, 210B or 225B, and so on, as described above with respect to FIGS. 2A-2B.

Referring to FIG. 10, at 1000, similar to 900 of FIG. 9, the NHN maintains a table that maps a plurality of internal identifiers configured to identify a plurality of subscriber UEs within the NHN to a plurality of intermediate subscriber identifiers configured to identify the plurality of subscriber UEs on an interface between the NHN and one or more non-MNO PSP networks. At 1005, the NHN obtains an SCEF-related message for transmission to an external application via a given non-MNO PSP network, the SCEF-related message being associated with an internal identifier that is maintained in the table for a given subscriber UE. For example, the SCEF-related message may originate at either the given subscriber UE or a component of the NHN itself, and may then be relayed to one of the IWK-SCEFs 235A, 205B or 220B or one of the local AAA proxies 240A, 210B or 225B, which obtains the SCEF-related message at 1005. In another example, at 1005, the SCEF-related message may obtained by virtue of being generated by the originating NHN component (e.g., the 'obtaining' of 1005 is an act of self-generation, as opposed to obtaining the SCEF-related message from an external source), or the SCEF-related message may be received from another device (e.g., given subscriber UE or another NHN component) for transport to a different NHN component, such as one of the IWK-SCEFs 235A, 205B or 220B.

Referring to 1005 of FIG. 10, in one example, the SCEF-related message may be transported within the NHN to the IWK-SCEF or local AAA proxy using the internal identifier, with the IWK-SCEF or local AAA proxy translating the SCEF-related message by swapping out the internal identifier for a corresponding intermediate subscriber identifier used for the given subscriber UE inside of the NHN. In this case, the IWK-SCEFs or local AAA proxies receive the SCEF-related message in association with the internal identifier, while the remaining NHN components only handle the SCEF-related message in association with the internal identifier. Thus, in this example, the IWK-SCEF or local AAA proxy performs the process of FIG. 10, whereas the remaining NHN components process the SCEF-related message without regard to the intermediate subscriber identifier.

Referring to 1005 of FIG. 10, in another example, the SCEF-related message may be transported between NHN components in association with (or containing) the intermediate subscriber identifier. In this case, the association between the SCEF-related message and the internal identifier at 1005 may be based on the NHN component being able to lookup the internal identifier using the identifier mapping table. Also, the IWK-SCEF or local AAA proxy need not swap out the intermediate subscriber identifier for a corresponding internal identifier used for the given subscriber UE inside of the NHN. In a further example, transporting the SCEF-related message through the NHN intact with the intermediate subscriber identifier may be possible based on each NHN component handling the SCEF-related message maintaining its own identifier mapping table. In other words, in this particular example, each NHN component handling the SCEF-related message that is exchanged with the intermediate subscriber identifier would independently maintain the identifier mapping table described above with respect to 1000 of FIG. 10. Moreover, in this particular example, each NHN component handling the SCEF-related message that is exchanged with the intermediate subscriber identifier would independently be performing the entirety of the process of FIG. 10, as will be described below in more detail.

At 1010, the NHN retrieves, from the table, an intermediate subscriber identifier that is mapped to the internal identifier within the table. As will be appreciated, in a scenario where the SCEF-related message includes the internal identifier, the retrieval of 1010 may be performed using the table, while in a scenario where the SCEF-related message includes the intermediate subscriber identifier, the retrieval of 1010 may correspond to extraction of the intermediate subscriber identifier from the SCEF-related message itself. At 1015, the NHN forwards the SCEF-related message to the given non-MNO PSP network in association with the retrieved intermediate subscriber identifier.

Referring to 1015 of FIG. 10, in an example, the forwarding operation may be performed by the IWK-SCEF or local AAA proxy, and may be considered an external forwarding operation that forwards the SCEF-related message outside of the NHN. In an alternative example, as noted above, the process of FIG. 10 may execute independently at various NHN components, and not merely the IWK-SCEF or local AAA proxy. Some of these NHN components (e.g., NH-GW 230A, etc.) may perform an intermediate subscriber identifier-based transport function. So, the internal identifier may be retrieved at 1010 of FIG. 10 to identify the given subscriber UE, the NHN component figures out how to route the SCEF-related message using the retrieved internal identifier as part of the processing at block 1015, after which the NHN component forwards the SCEF-related message to another NHN component using the intermediate subscriber identifier. The forwarding operation of 1015 in this case corresponds to an intra-NHN forwarding operation, although this intra-NHN forwarding operation is still indirectly a forwarding operation directed to the given non-MNO PSP network because the given non-MNO PSP network is the ultimate destination for the SCEF-related message. Hence, the forwarding operation of 1015 may be either a direct or indirect forwarding operation in the sense that it is possible for the SCEF-related message to pass through one or more additional NHN components before reaching the given non-MNO PSP network.

Figure 11:
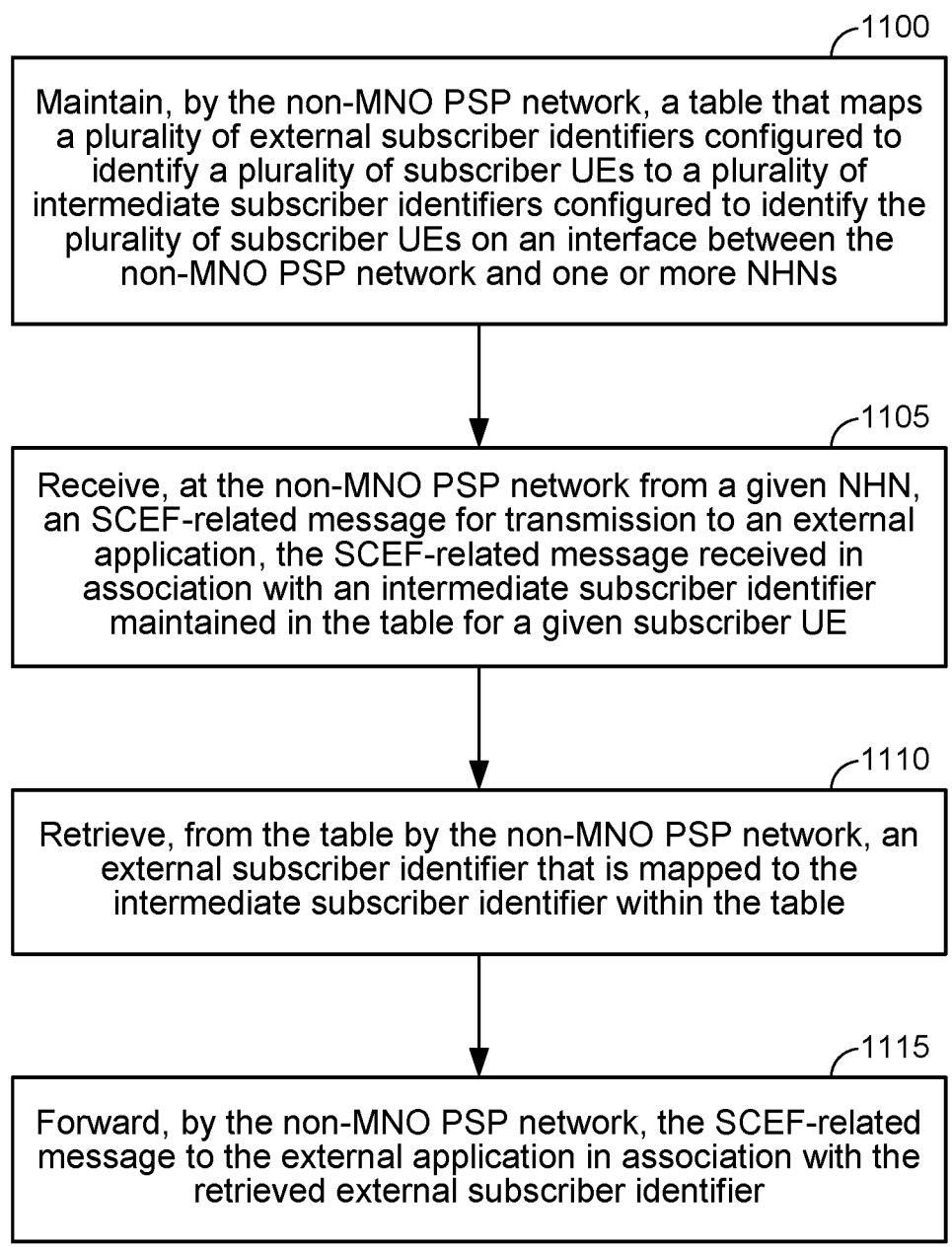
FIG. 11 illustrates a process of transporting an SCEF-related message in accordance with another embodiment of the disclosure.

FIG. 11 illustrates a process of transporting an SCEF-related message in accordance with another embodiment of the disclosure. The process of FIG. 11 may be performed at a component of a non-MNO PSP network, such as the SCEF 275B described above with respect to FIG. 2B.

Referring to FIG. 11, at 1100, similar to 900 of FIG. 9, the non-MNO PSP network maintains a table that maps a plurality of external subscriber identifiers configured to identify a plurality of subscriber UEs to a plurality of intermediate subscriber identifiers configured to identify the plurality of subscriber UEs on an interface between the non-MNO PSP network and one or more NHNs. At 1105, the non-MNO PSP network receives an SCEF-related message for transmission to an external application, the SCEF-related message received in association with an intermediate subscriber identifier maintained in the table for a given subscriber UE. At 1110, the non-MNO PSP network retrieves, from the table, an external subscriber identifier that is mapped to the intermediate subscriber identifier within the table. At 1115, the non-MNO PSP network forwards the SCEF-related message to the external application in association with the retrieved external subscriber identifier.

Figure 12:
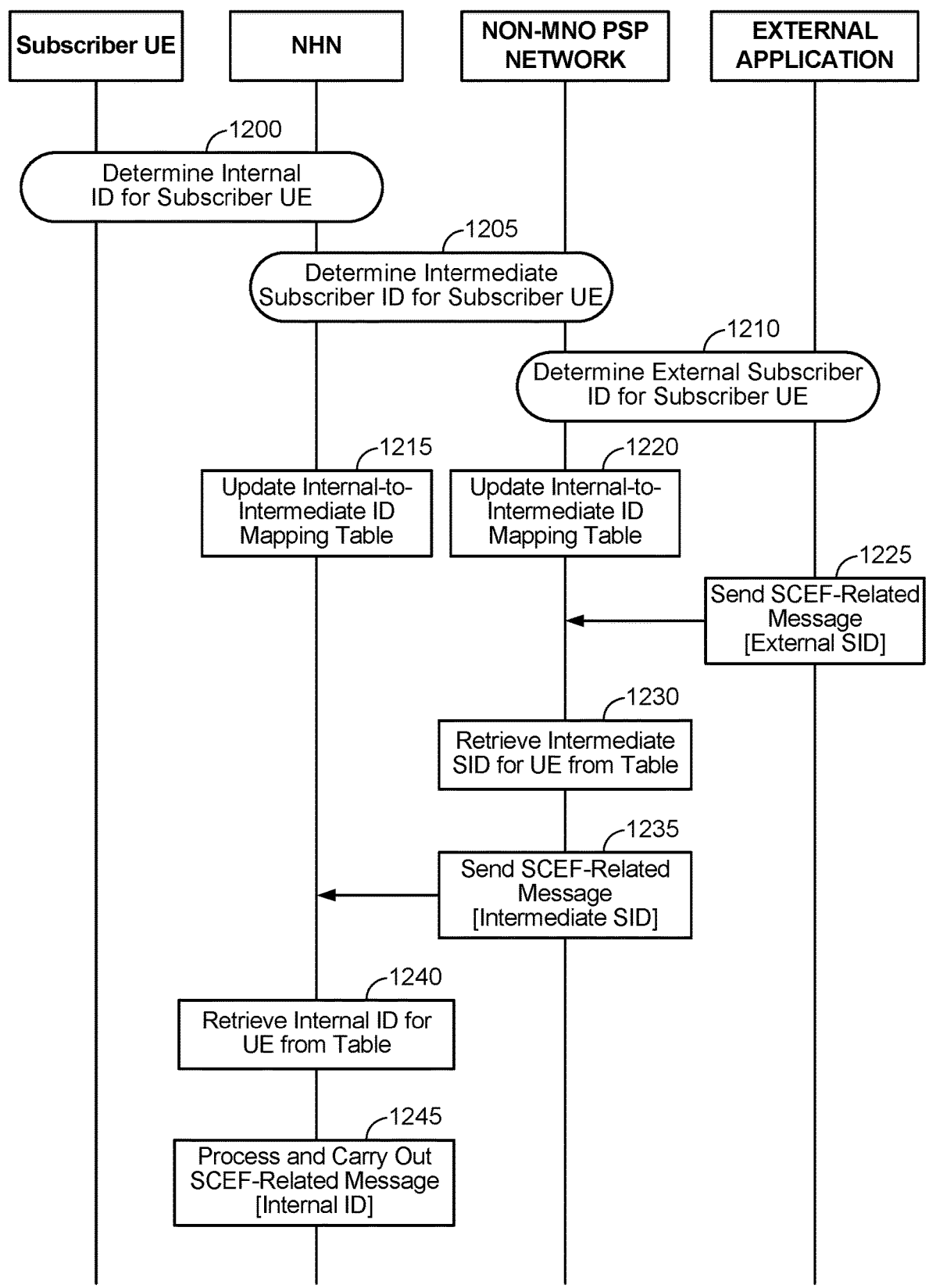
FIG. 12 illustrates an example implementation of the processes of FIGS. 8-9 in accordance with an embodiment of the disclosure.

FIG. 12 illustrates an example implementation of the processes of FIGS. 8-9 in accordance with an embodiment of the disclosure. At 1200, the subscriber UE and the NHN determine an internal identifier that is configured to identify the subscriber UE at least within the NHN. In an example, the internal identifier may correspond to the subscriber UE's P-IMSI, which may be assigned to the subscriber UE by an MNO and maintained at an HSS in a HPLMN of the subscriber UE. At 1205, the NHN and a non-MNO PSP network determine an intermediate subscriber identifier that is configured to identify the subscriber UE on an interface between the NHN and the non-MNO PSP network. In an example, the determination of 1205 may be a negotiation (e.g., the NHN or non-MNO PSP network proposes an intermediate subscriber identifier for a subscriber UE, which is accepted if the other entity has not yet reserved that particular intermediate subscriber identifier for another UE).

At 1210, the non-MNO PSP network and an external application determine an external subscriber identifier that is configured to identify the subscriber UE. In an example, the external subscriber identifier may be assigned to the subscriber UE by the external application in association with a subscription-based service (e.g., a non-MNO IP service).

Referring to FIG. 12, at 1215 (e.g., as in 900 of FIG. 9), the NHN updates an NHN-maintained internal-to-intermediate identifier mapping table to include a mapping between the internal identifier from 1200 and the intermediate subscriber identifier from 1205 for the subscriber UE. At 1220, (e.g., as in 800 of FIG. 8), the non-MNO PSP network updates a PSP-maintained intermediate-to-external identifier mapping table to include a mapping between the intermediate subscriber identifier from 1205 and the external subscriber identifier from 1210 for the subscriber UE.

Referring to FIG. 12, at 1225 (e.g., as in 805 of FIG. 8), the non-MNO PSP network receives an SCEF-related message from the external application in association with the external subscriber identifier for the subscriber UE. At 1230 (e.g., as in 810 of FIG. 8), the non-MNO PSP network retrieves the intermediate subscriber identifier that is mapped to the external subscriber identifier in the table. At 1235 (e.g., as in 815 of FIG. 8 or 905 of FIG. 9), the non-MNO PSP network forwards the SCEF-related message to the NHN in association with the retrieved intermediate subscriber identifier. In an example, the forwarding of the SCEF-related message to the NHN at 1235 may be based upon a determination at the non-MNO PSP network that the NHN is a current serving NHN of the subscriber UE, or that the NHN is within a set of possible current serving NHNs of the subscriber UE, as described above with respect to FIGS. 4A-7.

Referring to FIG. 12, at 1240 (e.g., as in 910 of FIG. 9), the NHN retrieves the internal identifier that is mapped to the intermediate subscriber identifier in the table. At 1245 (e.g., as in 915 of FIG. 9), the NHN processes and carries out the SCEF-related message using the retrieved internal identifier. In an example, if the SCEF-related message is targeted to the subscriber UE, the NHN forwards the SCEF-related message to the subscriber UE using the retrieved internal identifier at 1245 (e.g., an IWK-SCEF of the NHN sending the SCEF-related message to an NH-MME, which then routes the SCEF-related message to the subscriber UE using the internal identifier). In another example, if the SCEF-related message is targeted to the subscriber UE, the NHN forwards the SCEF-related message to the subscriber UE between various NHN components using the intermediate subscriber identifier, as described above with respect to FIG. 9. In another example, if the SCEF-related message is targeted to an NHN component, the NHN routes the SCEF-related message to the target NHN component at 1245 in association with either the retrieved internal identifier or the intermediate subscriber identifier, which may then initiate SCEF-related action(s) with respect to the subscriber UE.

Figure 13:
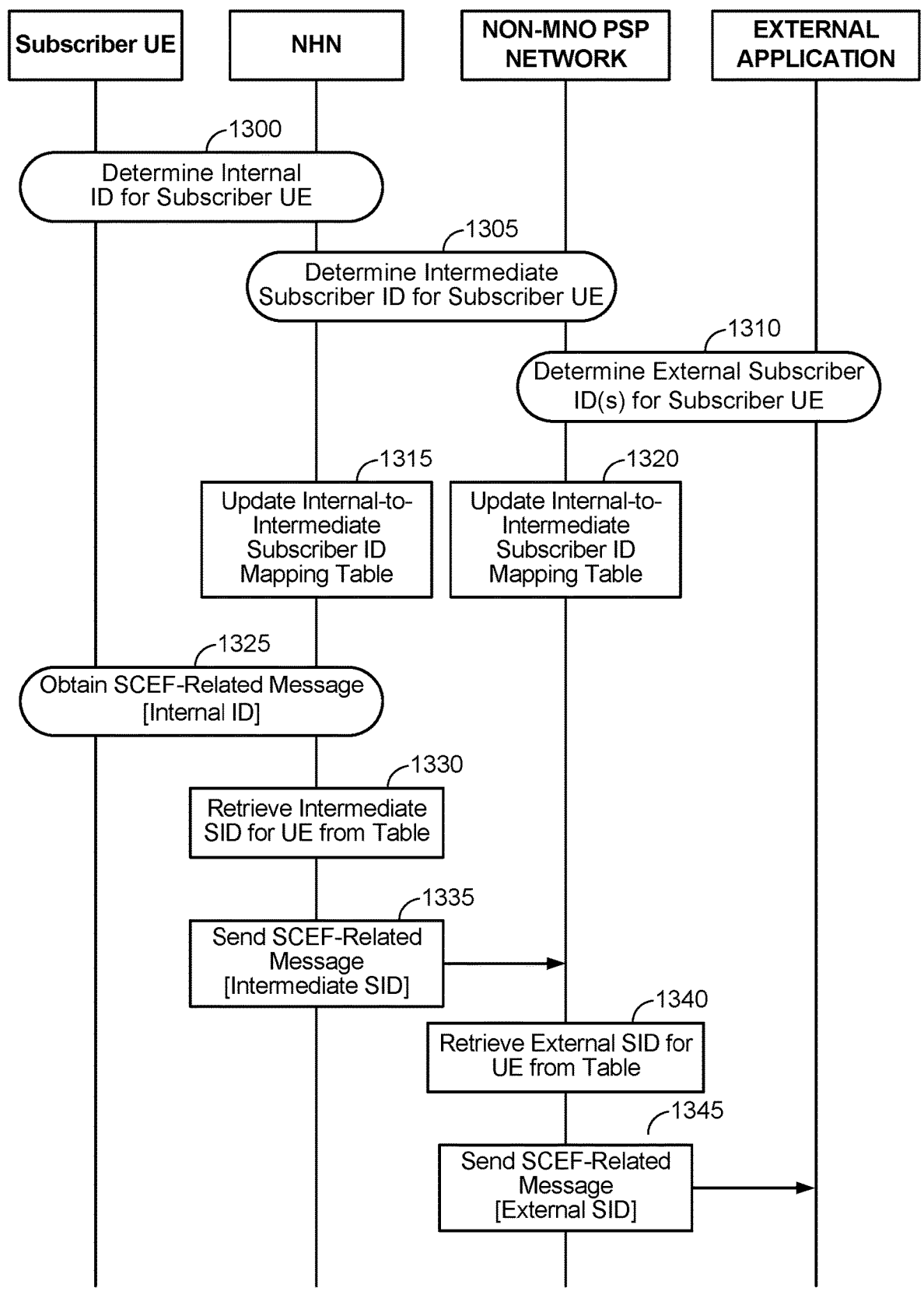
FIG. 13 illustrates an example implementation of the processes of FIGS. 10-11 in accordance with an embodiment of the disclosure.

FIG. 13 illustrates an example implementation of the processes of FIGS. 10-11 in accordance with an embodiment of the disclosure. Referring to FIG. 13, 1300-1320 correspond to 1200-1210 of FIG. 12, respectively, and as such will not be discussed further for the sake of brevity.

Referring to FIG. 13, at 1325 (e.g., as in 1005 of FIG. 10), the NHN obtains an SCEF-related message (e.g., from a source subscriber UE or another NHN component) for transmission to an external application that is associated with the internal identifier for the subscriber UE (e.g., the association may be based on the SCEF-related message including the internal identifier, or alternatively based on the SCEF-related message including an intermediate subscriber identifier for the subscriber UE from which the internal identifier can be looked up). The SCEF-related message obtained at 1325 may originate at the subscriber UE itself (i.e., without direct NHN involvement), or alternatively may originate at an NHN component. At 1330 (e.g., as in 1010 of FIG. 10), the NHN retrieves the intermediate subscriber identifier that is mapped to the internal identifier in the table (e.g., either from the table, or the SCEF-related message itself, depending on whether the SCEF-related message includes the internal identifier or the intermediate subscriber identifier). At 1335 (e.g., as in 1015 of FIG. 10 or 1105 of FIG. 11), the NHN forwards the SCEF-related message to the non-MNO PSP network in association with the retrieved intermediate subscriber identifier (e.g., either directly to the non-MNO PSP network by the IWK-SCEF, or indirectly via intra-NHN forwarding).

Referring to FIG. 13, at 1340 (e.g., as in 1110 of FIG. 11), the non-MNO PSP network retrieves the external subscriber identifier that is mapped to the intermediate subscriber identifier in the table. At 1345 (e.g., as in 1115 of FIG. 11), the non-MNO PSP network forwards the SCEF-related message to the external application in association with the retrieved external subscriber identifier.

Figure 14:
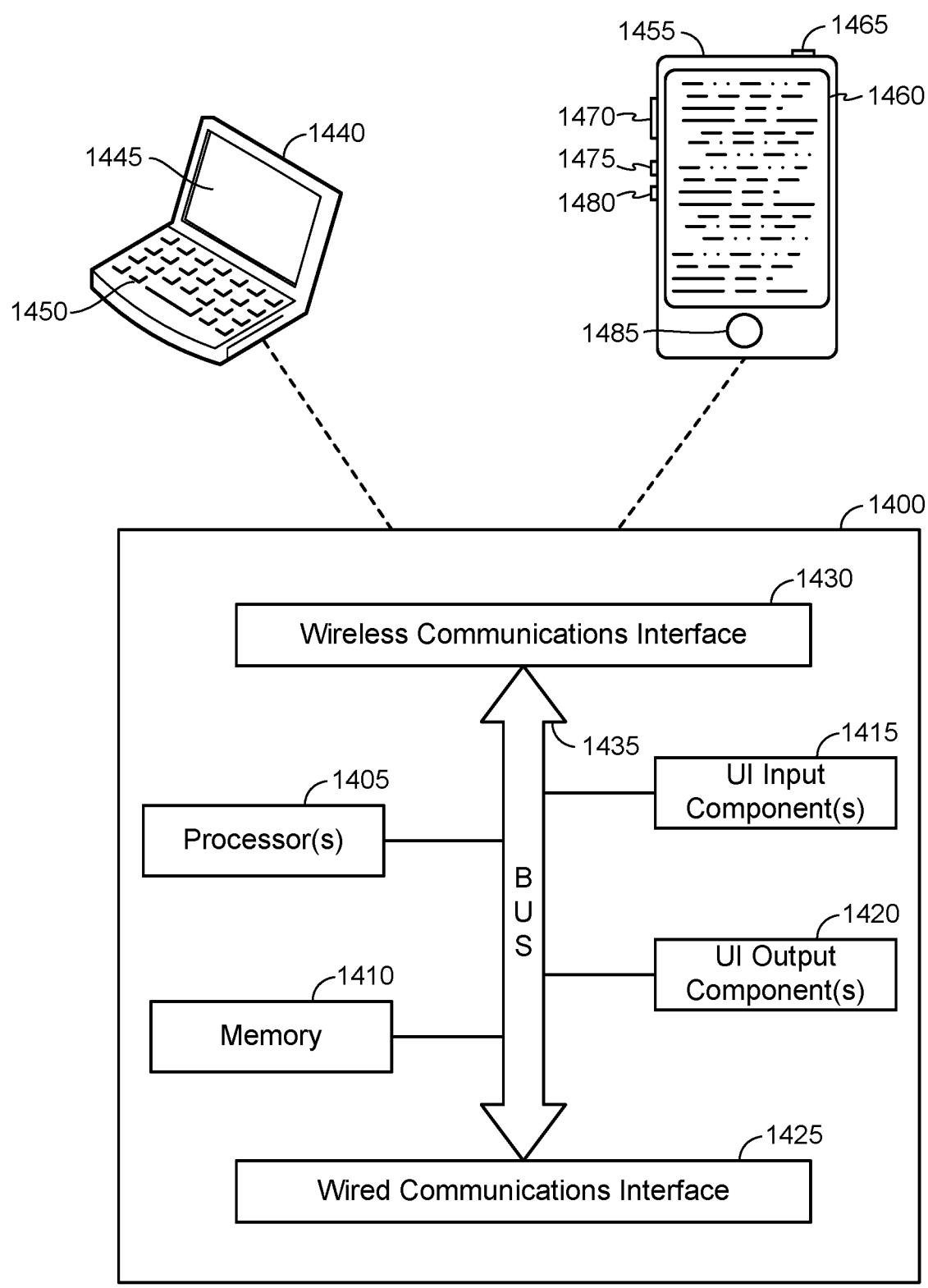
FIG. 14 illustrates a UE in accordance with an embodiment of the disclosure.

FIG. 14 illustrates a UE 1400 in accordance with an embodiment of the disclosure. In an example, the UE 1400 may correspond to any of the UEs discussed in association with the embodiments above. The UE 1400 includes one or more processors 1405 (e.g., one or more ASICs, one or more digital signal processors (DSPs), etc.) and a memory 1410 (e.g., RAM, ROM, EEPROM, flash cards, or any memory common to computer platforms). The UE 1400 also includes one or more UI input components 1415 (e.g., a keyboard and mouse, a touchscreen, a microphone, one or more buttons such as volume or power buttons, etc.) and one or more UI output components 1420 (e.g., speakers, a display screen, a vibration device for vibrating the UE 1400, etc.).

The UE 1400 further includes a wired communications interface 1425 and a wireless communications interface 1430. In an example embodiment, the wired communications interface 1425 can be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 1430 includes one or more wireless transceivers for communication in accordance with a local wireless communications protocol (e.g., WLAN or WiFi, WiFi Direct, Bluetooth, etc.). The wireless communications interface 1430 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 1405-1430 of the UE 1400 can communicate with each other via a bus 1435.

Referring to FIG. 14, the UE 1400 may correspond to any type of UE, including but not limited to a smart phone, a laptop computer, a desktop computer, a tablet computer, a wearable device (e.g., a pedometer, a smart watch, etc.) and so on. Two particular implementation examples of the UE 1400 are depicted in FIG. 14, which are illustrated as laptop 1440 and touchscreen device 1455 (e.g., a smart phone, a tablet computer, etc.). The laptop 1440 includes a display screen 1445 and a UI area 1450 (e.g., keyboard, touchpad, power button, etc.), and while not shown the laptop 1440 may include various ports as well as wired and/or wireless transceivers (e.g., Ethernet card, WiFi card, broadband card, etc.).

The touchscreen device 1455 is configured with a touchscreen display 1460, peripheral buttons 1465, 1470, 1475 and 1480 (e.g., a power control button, a volume or vibrate control button, an airplane mode toggle button, etc.), and at least one front-panel button 1485 (e.g., a Home button, etc.), among other components, as is known in the art. While not shown explicitly as part of the touchscreen device 1455, the touchscreen device 1455 can include one or more external antennas and/or one or more integrated antennas that are built into the external casing of the touchscreen device 1455, including but not limited to WiFi antennas, cellular antennas, satellite position system (SPS) antennas (e.g., global positioning system (GPS) antennas), and so on.

Figure 15:
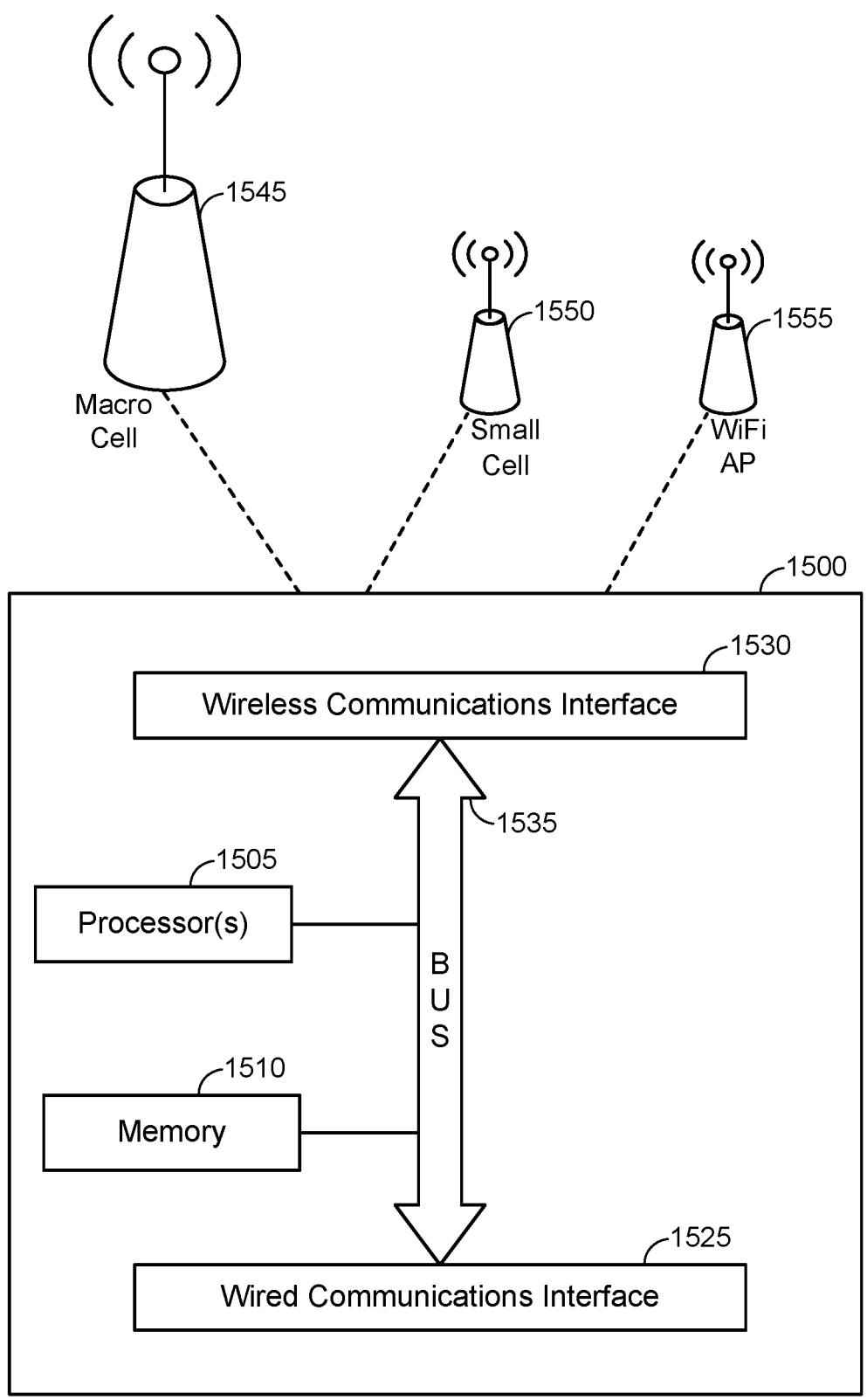
FIG. 15 illustrates an access point in accordance with an embodiment of the disclosure.

FIG. 15 illustrates an access point 1500 in accordance with an embodiment of the disclosure. The access point 1500 includes one or more processors 1505 (e.g., one or more ASICs, one or more DSPs, etc.) and a memory 1510 (e.g., RAM, ROM, EEPROM, flash cards, or any memory common to computer platforms). The access point 1500 further includes a wired communications interface 1525 and a wireless communications interface 1530. The various components 1505-1530 of the access point 1500 can communicate with each other via a bus 1535.

In an example embodiment, the wired communications interface 1525 can be used to connect to one or more backhaul components. Depending on the network infrastructure where the access point is deployed, the one or more backhaul components to which the access point 1500 is connected via the wired communications interface 1525 may include a base station controller (BSC), a radio network controller (RNC), other access points (e.g., other Node Bs via X2 connections as defined by LTE), core network components such as a serving gateway (S-GW) or a mobility management entity (MME), and so on.

In another example embodiment, the wireless communications interface 1530 includes one or more wireless transceivers for communication in accordance with a wireless communications protocol. The wireless communications protocol may be based on the configuration of the access point 1500. For example, if the access point 1500 is implemented as macro cell 1545 or small cell 1550 (e.g., a femto cell, a pico cell, etc.), the wireless communications interface 1530 may include one or more wireless transceivers configured to implement a cellular protocol (e.g., CDMA, W-CDMA, GSM, 3G, 4G, 5G, etc.). In another example, if the access point 1500 is implemented as WiFi AP 1555, the wireless communications interface 1530 may include one or more wireless transceivers configured to implement a WiFi (or 802.11) protocol (e.g., 802.11a, 802.11b, 802.11g, 802.11n, etc.).

Figure 16:
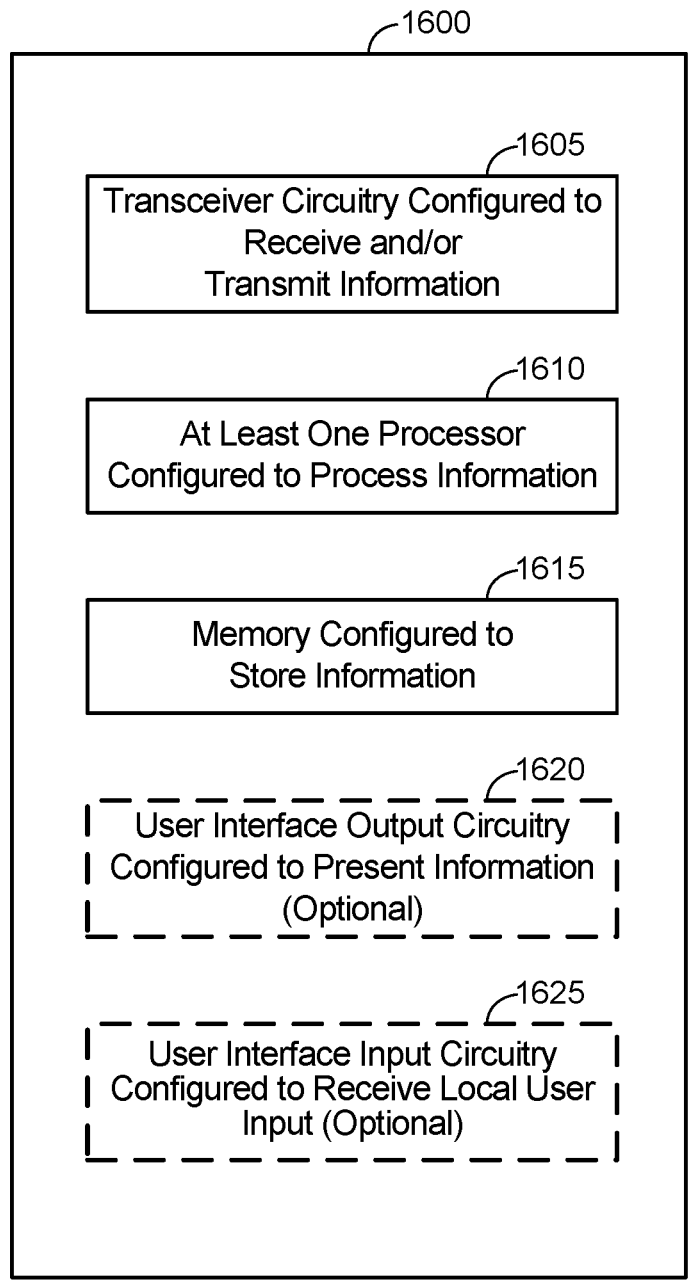
FIG. 16 illustrates a communications device that includes structural components in accordance with an embodiment of the disclosure.

FIG. 16 illustrates a communications device 1600 that includes structural components in accordance with an embodiment of the disclosure. The communications device 1600 can correspond to any of the above-noted communications devices, including but not limited to UE 1400 or access point 1500, any component included in the NHNs or PSP networks disclosed above, and so on. Thus, communications device 1600 can correspond to any electronic device that is configured to communicate with (or facilitate communication with) one or more other entities over a communications network.

Referring to FIG. 16, the communications device 1600 includes transceiver circuitry configured to receive and/or transmit information 1605. In an example, if the communications device 1600 corresponds to a wireless communications device (e.g., UE 1400), the transceiver circuitry configured to receive and/or transmit information 1605 can include a wireless communications interface (e.g., Bluetooth, WiFi, WiFi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 1605 can correspond to a wired communications interface (e.g., a serial connection, a USB or Firewire connection, an Ethernet connection through which the Internet can be accessed, etc.). Thus, if the communications device 1600 corresponds to some type of network-based server or core network component (e.g., of an NHN or PSP network), the transceiver circuitry configured to receive and/or transmit information 1605 can correspond to an Ethernet card (or another network routing circuit component), in an example, that connects the network-based server or core network component to other communication entities via an Ethernet protocol. In a further example, the transceiver circuitry configured to receive and/or transmit information 1605 can include sensory or measurement hardware by which the communications device 1600 can monitor its local environment (e.g., an accelerometer, a temperature sensor, a light sensor, an antenna for monitoring local RF signals, etc.). The transceiver circuitry configured to receive and/or transmit information 1605 can also include software that, when executed, permits the associated hardware of the transceiver circuitry configured to receive and/or transmit information 1605 to perform its reception and/or transmission function(s). However, the transceiver circuitry configured to receive and/or transmit information 1605 does not correspond to software alone, and the transceiver circuitry configured to receive and/or transmit information 1605 relies at least in part upon structural hardware to achieve its functionality. Moreover, the transceiver circuitry configured to receive and/or transmit information 1605 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 1605 in certain contexts as being specific types of receive functions. In another example, functions such as sending, delivering, conveying, forwarding, etc., may be performed by the transceiver circuitry configured to receive and/or transmit information 1605 in certain contexts as being specific types of transmit functions. Other functions that correspond to other types of receive and/or transmit functions may also be performed by the transceiver circuitry configured to receive and/or transmit information 1605.

Referring to FIG. 16, the communications device 1600 further includes at least one processor configured to process information 1610. Example implementations of the type of processing that can be performed by the at least one processor configured to process information 1610 includes but is not limited to performing determinations, establishing connections, making selections between different information options, performing evaluations related to data, interacting with sensors coupled to the communications device 1600 to perform measurement operations, converting information from one format to another (e.g., between different protocols such as .wmv to .avi, etc.), and so on. For example, the at least one processor configured to process information 1610 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 1610 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 1610 can also include software that, when executed, permits the associated hardware of the at least one processor configured to process information 1610 to perform its processing function(s). However, the at least one processor configured to process information 1610 does not correspond to software alone, and the at least one processor configured to process information 1610 relies at least in part upon structural hardware to achieve its functionality. Moreover, the at least one processor configured to process information 1610 may be implicated by language other than "processing", so long as the underlying function corresponds to a processing function. For example, functions such as evaluating, determining, calculating, identifying, etc., may be performed by the at least one processor configured to process information 1610 in certain contexts as being specific types of processing functions. Other functions that correspond to other types of processing functions may also be performed by the at least one processor configured to process information 1610.

Referring to FIG. 16, the communications device 1600 further includes memory configured to store information 1615. In an example, the memory configured to store information 1615 can include at least a non-transitory memory and associated hardware (e.g., a memory controller, etc.). For example, the non-transitory memory included in the memory configured to store information 1615 can correspond to RAM, flash memory, ROM, erasable programmable ROM (EPROM), EEPROM, registers, hard disk, a removable disk, a CD-ROM, or any other form of storage medium known in the art. The memory configured to store information 1615 can also include software that, when executed, permits the associated hardware of the memory configured to store information 1615 to perform its storage function(s). However, the memory configured to store information 1615 does not correspond to software alone, and the memory configured to store information 1615 relies at least in part upon structural hardware to achieve its functionality. Moreover, the memory configured to store information 1615 may be implicated by language other than "storing", so long as the underlying function corresponds to a storing function. For example, functions such as caching, maintaining, etc., may be performed by the memory configured to store information 1615 in certain contexts as being specific types of storing functions. Other functions that correspond to other types of storing functions may also be performed by the memory configured to store information 1615.

Referring to FIG. 16, the communications device 1600 further optionally includes user interface output circuitry configured to present information 1620. In an example, the user interface output circuitry configured to present information 1620 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 1600. For example, if the communications device 1600 corresponds to the UE 1400 as shown in FIG. 14, the user interface output circuitry configured to present information 1620 can include a display such as display screen 1445 or touchscreen display 1460. In a further example, the user interface output circuitry configured to present information 1620 can be omitted for certain communications devices, such as network communications devices that do not have a local user (e.g., network switches or routers, remote servers, etc.). The user interface output circuitry configured to present information 1620 can also include software that, when executed, permits the associated hardware of the user interface output circuitry configured to present information 1620 to perform its presentation function(s). However, the user interface output circuitry configured to present information 1620 does not correspond to software alone, and the user interface output circuitry configured to present information 1620 relies at least in part upon structural hardware to achieve its functionality. Moreover, the user interface output circuitry configured to present information 1620 may be implicated by language other than "presenting", so long as the underlying function corresponds to a presenting function. For example, functions such as displaying, outputting, prompting, conveying, etc., may be performed by the user interface output circuitry configured to present information 1620 in certain contexts as being specific types of presenting functions. Other functions that correspond to other types of presenting functions may also be performed by the user interface output circuitry configured to present information 1620.

Referring to FIG. 16, the communications device 1600 further optionally includes user interface input circuitry configured to receive local user input 1625. In an example, the user interface input circuitry configured to receive local user input 1625 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 1600. For example, if the communications device 1600 corresponds to UE 1400 as shown in FIG. 14, the user interface input circuitry configured to receive local UI area 1450 or touchscreen display 1460, etc. In a further example, the user interface input circuitry configured to receive local user input 1625 can be omitted for certain communications devices, such as network communications devices that do not have a local user (e.g., network switches or routers, remote servers, etc.). The user interface input circuitry configured to receive local user input 1625 can also include software that, when executed, permits the associated hardware of the user interface input circuitry configured to receive local user input 1625 to perform its input reception function(s). However, the user interface input circuitry configured to receive local user input 1625 does not correspond to software alone, and the user interface input circuitry configured to receive local user input 1625 relies at least in part upon structural hardware to achieve its functionality. Moreover, the user interface input circuitry configured to receive local user input 1625 may be implicated by language other than "receiving local user input", so long as the underlying function corresponds to a receiving local user function. For example, functions such as obtaining, receiving, collecting, etc., may be performed by the user interface input circuitry configured to receive local user input 1625 in certain contexts as being specific types of receiving local user functions. Other functions that correspond to other types of receiving local user input functions may also be performed by the user interface input circuitry configured to receive local user input 1625.

Referring to FIG. 16, while the configured structural components of 1605 through 1625 are shown as separate or distinct blocks in FIG. 16 that are implicitly coupled to each other via an associated communication bus (not shown expressly), it will be appreciated that the hardware and/or software by which the respective configured structural components of 1605 through 1625 performs their respective functionality can overlap in part. For example, any software used to facilitate the functionality of the configured structural components of 1605 through 1625 can be stored in the non-transitory memory associated with the memory configured to store information 1615, such that the configured structural components of 1605 through 1625 each performs their respective functionality (i.e., in this case, software execution) based in part upon the operation of software stored by the memory configured to store information 1615. Likewise, hardware that is directly associated with one of the configured structural components of 1605 through 1625 can be borrowed or used by other of the configured structural components of 1605 through 1625 from time to time. For example, the at least one processor configured to process information 1610 can format data into an appropriate format before being transmitted by the transceiver circuitry configured to receive and/or transmit information 1605, such that the transceiver circuitry configured to receive and/or transmit information 1605 performs its functionality (i.e., in this case, transmission of data) based in part upon the operation of structural hardware associated with the at least one processor configured to process information 1610.

Figure 17:
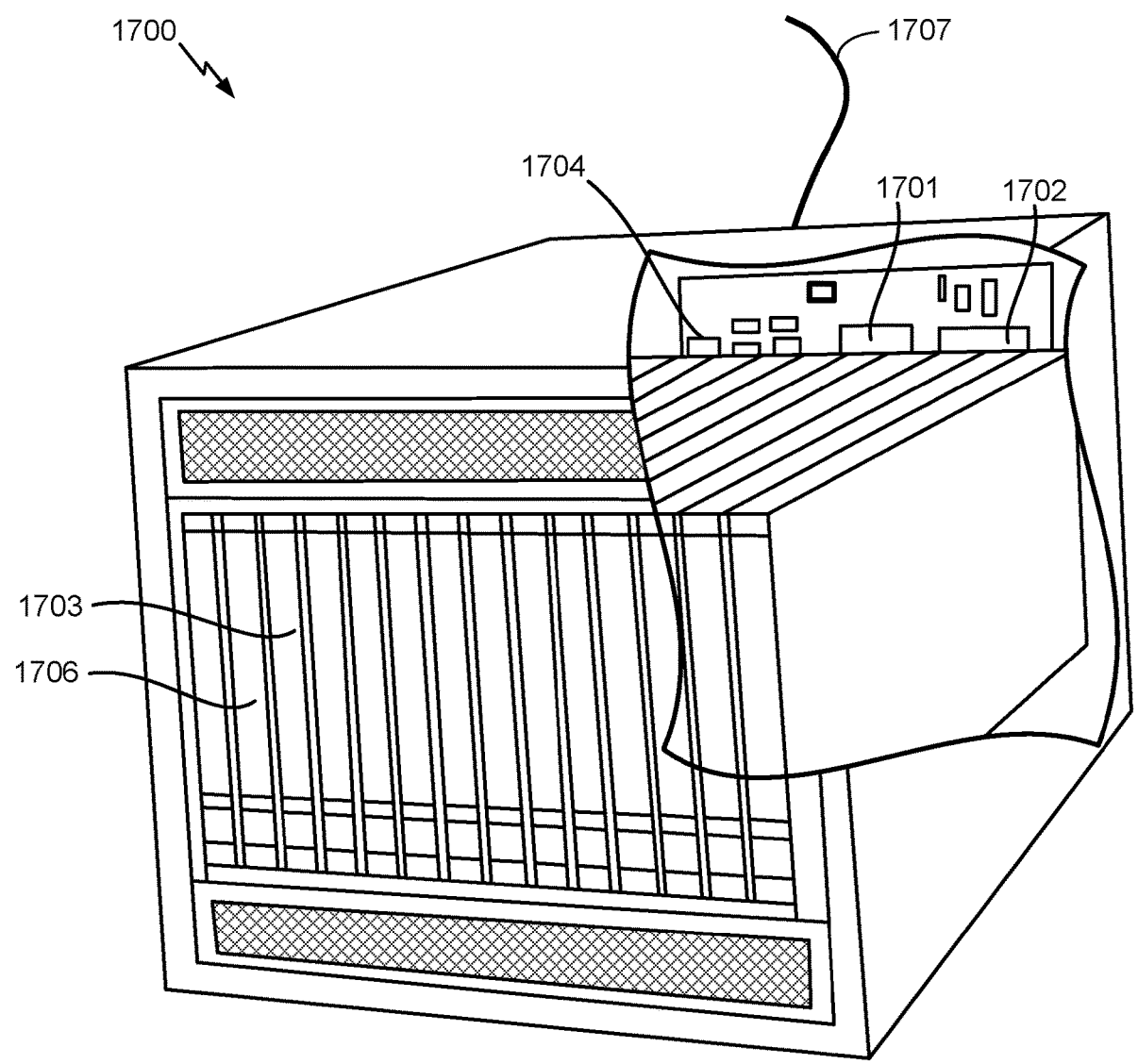
FIG. 17 illustrates a server in accordance with an embodiment of the disclosure.

The various embodiments may be implemented on any of a variety of commercially available server devices, such as server 1700 illustrated in FIG. 17. In an example, the server 1700 may correspond to one example configuration of the server 1700 described above. In FIG. 17, the server 1700 includes a processor 1701 coupled to volatile memory 1702 and a large capacity nonvolatile memory, such as a disk drive 1703. The server 1700 may also include a floppy disc drive, compact disc (CD) or DVD disc drive 1706 coupled to the processor 1701. The server 1700 may also include network access ports 1704 coupled to the processor 1701 for establishing data connections with a network 1707, such as a local area network coupled to other broadcast system computers and servers or to the Internet. In context with FIG. 16, it will be appreciated that the server 1700 of FIG. 17 illustrates one example implementation of the communications device 1600, whereby the transceiver circuitry configured to receive and/or transmit information 1605 corresponds to the network access ports 1704 used by the server 1700 to communicate with the network 1707, the at least one processor configured to process information 1610 corresponds to the processor 1701, and the memory configuration to store information 1615 corresponds to any combination of the volatile memory 1702, the disk drive 1703 and/or the disc drive 1706. The optional user interface output circuitry configured to present information 1620 and the optional user interface input circuitry configured to receive local user input 1625 are not shown explicitly in FIG. 17 and may or may not be included therein. Thus, FIG. 17 helps to demonstrate that the communications device 1600 may be implemented as a server (e.g., a component of the NHN and/or PSP network), in addition to a UE as in FIG. 14 or an access point as in FIG. 15.

While the embodiments of the disclosure have generally been described above in context with SCEF as defined in 3GPP Release 13+, a comparable Exposure Function defined for 5G (or 5G New Radio) is referred to as Network Exposure Function (NEF). Generally, reference to SCEF as used herein is intended to broadly encompass any type of Exposure Function in any wireless communications network, such as NEF in 5G.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a component of a non-Mobile Network Operator (MNO) Participating Service Provider (PSP) network, comprising:
   maintaining, by the non-MNO PSP network, a table that maps a plurality of external subscriber identifiers configured to identify a plurality of user equipments (UEs) to a plurality of intermediate subscriber identifiers configured to identify the plurality of UEs on an interface between the non-MNO PSP network and one or more Neutral Host Networks (NHNs);
   obtaining, by the non-MNO PSP network, a Service Capability Exposure Function (SCEF)-related message in association with a first identifier maintained in the table for a given UE;
   retrieving, from the table by the non-MNO PSP network, a second identifier of the given UE that is mapped to the first identifier within the table; and
   forwarding, by the non-MNO PSP network, the SCEF-related message in association with the retrieved second identifier, wherein the retrieved second identifier is a retrieved intermediate subscriber identifier for a current serving NHN of the given UE, wherein the plurality of intermediate subscriber identifiers are established via negotiation between the non-MNO PSP network and the one or more NHNs.

2. The method of claim 1,
wherein the first identifier is an external identifier, and
wherein the forwarding forwards the SCEF-related message to the current serving NHN of the given UE in association with the retrieved intermediate subscriber identifier.

3. The method of claim 2, wherein the plurality of external subscriber identifiers are assigned by one or more external applications separate from the non-MNO PSP network.

4. The method of claim 2,
wherein the given UE is associated with different external subscriber identifiers by different external applications, and
wherein the table maps each of the different external subscriber identifiers to the same intermediate subscriber identifier at least for the current serving NHN.

5. The method of claim 2,
wherein the table maps the external subscriber identifier to the same intermediate subscriber identifier for at least one other NHN of the given UE, or
wherein the table maps the external subscriber identifier to a different intermediate subscriber identifier for the at least one other NHN of the given UE.

6. The method of claim 2, wherein the SCEF-related message is targeted to the given UE.

7. The method of claim 2, wherein the SCEF-related message is targeted to a network component of the current serving NHN.

8. The method of claim 1,
wherein the first identifier is an intermediate subscriber identifier,
wherein the retrieved second identifier is a retrieved an external subscriber identifier, and
wherein the forwarding forwards the SCEF-related message to an external application in association with the retrieved external subscriber identifier.

9. The method of claim 8, wherein the plurality of external subscriber identifiers are assigned by one or more external applications separate from the non-MNO PSP network.

10. The method of claim 8, wherein the plurality of intermediate subscriber identifiers are established via negotiation between the non-MNO PSP network and the one or more NHNs.

11. The method of claim 8,
wherein the given UE is associated with different external subscriber identifiers by different external applications, and
wherein the table maps each of the different external subscriber identifiers to the same intermediate subscriber identifier at least for the given NHN.

12. The method of claim 8, wherein the table maps the external subscriber identifier to the same intermediate subscriber identifier for at least one other NHN of the given UE.

13. The method of claim 12, wherein the table maps the external subscriber identifier to a different intermediate subscriber identifier for the at least one other NHN of the given UE.

14. The method of claim 8, wherein the SCEF-related message originates at the given UE.

15. The method of claim 8, wherein the SCEF-related message originates at a network component of the given NHN.

16. A component of a non-Mobile Network Operator (MNO) Participating Service Provider (PSP) network, comprising: at least one processor coupled to at least one transceiver and configured to:
maintain a table that maps a plurality of external subscriber identifiers configured to identify a plurality of user equipments (UEs) to a plurality of intermediate subscriber identifiers configured to identify the plurality of UEs on an interface between the non-MNO PSP network and one or more Neutral Host Networks (NHNs);
obtain a Service Capability Exposure Function (SCEF)-related message in association with a first identifier maintained in the table for a given UE;
retrieve, from the table, a second identifier of the given UE that is mapped to the first identifier within the table; and
forward the SCEF-related message in association with the retrieved second identifier, wherein the retrieved second identifier is a retrieved intermediate subscriber identifier for a current serving NHN of the given UE, wherein the plurality of intermediate subscriber identifiers are established via negotiation between the non-MNO PSP network and the one or more NHNs.

17. The component of claim 16,
wherein the first identifier is an external identifier, and
wherein the at least one processor forwards the SCEF-related message to the current serving NHN of the given UE in association with the retrieved intermediate subscriber identifier.

18. The component of claim 17, wherein the plurality of external subscriber identifiers are assigned by one or more external applications separate from the non-MNO PSP network.

19. The component of claim 17,
wherein the given UE is associated with different external subscriber identifiers by different external applications, and
wherein the table maps each of the different external subscriber identifiers to the same intermediate subscriber identifier at least for the current serving NHN.

20. The component of claim 17,
wherein the table maps the external subscriber identifier to the same intermediate subscriber identifier for at least one other NHN of the given UE, or
wherein the table maps the external subscriber identifier to a different intermediate subscriber identifier for the at least one other NHN of the given UE.

21. The component of claim 17, wherein the SCEF-related message is targeted to the given UE.

22. The component of claim 17, wherein the SCEF-related message is targeted to a network component of the current serving NHN.

23. The component of claim 16,
wherein the first identifier is an intermediate subscriber identifier,
wherein the retrieved second identifier is a retrieved an external subscriber identifier, and
wherein the at least one processor forwards the SCEF-related message to an external application in association with the retrieved external subscriber identifier.

24. The component of claim 23, wherein the plurality of external subscriber identifiers are assigned by one or more external applications separate from the non-MNO PSP network.

25. The component of claim 23, wherein the plurality of intermediate subscriber identifiers are established via negotiation between the non-MNO PSP network and the one or more NHNs.

26. The component of claim 23,
wherein the given UE is associated with different external subscriber identifiers by different external applications, and
wherein the table maps each of the different external subscriber identifiers to the same intermediate subscriber identifier at least for the given NHN.

27. The component of claim 23, wherein the table maps the external subscriber identifier to the same intermediate subscriber identifier for at least one other NHN of the given UE.

28. The component of claim 27, wherein the table maps the external subscriber identifier to a different intermediate subscriber identifier for the at least one other NHN of the given UE.

29. The component of claim 23, wherein the SCEF-related message originates at the given UE.

30. The component of claim 23, wherein the SCEF-related message originates at a network component of the given NHN.

31. A method of operating a component of a Neutral Host Network (NHN), comprising:
maintaining, by the NHN, a table that maps a plurality of internal identifiers configured to identify a plurality of user equipments (UEs) within the NHN to a plurality of intermediate subscriber identifiers configured to identify the plurality of UEs on an interface between the NHN and one or more non-Mobile Network Operator (MNO) Participating Service Provider (PSP) networks;
obtaining, at the NHN from a given non-MNO PSP network, a Service Capability Exposure Function (SCEF)-related message in association with a first identifier maintained in the table for a given UE;
retrieving, from the table by the NHN, a second identifier that is mapped to the first identifier within the table; and
performing, by the NHN, an action on the SCEF-related message using the retrieved second identifier, wherein the first identifier is an intermediate subscriber identifier, wherein the plurality of intermediate subscriber identifiers are established via negotiation between the NHN and the one or more non-MNO PSP networks.

32. The method of claim 31,
wherein the retrieved second identifier is a retrieved internal identifier, and
wherein the action is processing the SCEF-related message using the retrieved internal identifier.

33. The method of claim 32, wherein the single NHN component is one of an Interworking Function (IWK) Service Capability Exposure Function (SCEF) and a Local AAA Proxy.

34. The method of claim 32, wherein the table is maintained at multiple NHN components of the NHN.

35. The method of claim 32, wherein the plurality of internal identifiers are Pseudo International Mobile Subscriber Identifiers (P-IMSIs).

36. The method of claim 32,
wherein the table maps the retrieved internal identifier to the same intermediate subscriber identifier for at least one other non-MNO PSP network of the given UE, or
wherein the table maps the retrieved internal identifier to a different intermediate subscriber identifier for the at least one other non-MNO PSP network of the given UE.

37. The method of claim 32,
wherein the SCEF-related message is targeted to the given UE, or
wherein the SCEF-related message is targeted to a network component of the NHN.

38. The method of claim 37, wherein the SCEF-related message is targeted to the given UE, wherein the processing includes:
modifying the SCEF-related message by setting a destination address of the SCEF-related message to the internal identifier of the given UE, and forwarding the modified SCEF-related message for delivery to the given UE, further comprising:
forwarding the SCEF-related message for delivery to the given UE with the destination address set to the intermediate subscriber identifier that is mapped to the retrieved internal identifier within the table.

39. The method of claim 37,
wherein the SCEF-related message is targeted to the network component of the NHN, further comprising:
transporting the SCEF-related message to the network component.

40. The method of claim 39, wherein the transporting transports the SCEF-related message using the retrieved internal identifier or the intermediate subscriber identifier that is mapped to the retrieved internal identifier within the table.

41. The method of claim 37,
wherein the SCEF-related message is targeted to the network component of the NHN,
wherein the network component to which the SCEF-related message is targeted performs at least one of the maintaining, the obtaining, the retrieving and the processing, and
wherein the processing includes the network component performing one or more SCEF-related actions in association with the given UE.

42. The method of claim 31, wherein the table is maintained at a single NHN component of the NHN.

43. The method of claim 31,
wherein the first identifier is an internal identifier,
wherein the retrieved second identifier is a retrieved intermediate subscriber identifier, and
wherein the action is forwarding the SCEF-related message to the given non-MNO PSP network in association with the retrieved intermediate subscriber identifier.

44. The method of claim 43, wherein the table is maintained at a single NHN component of the NHN.

45. The method of claim 44, wherein the single NHN component is one of an Interworking Function (IWK) Service Capability Exposure Function (SCEF) and a Local AAA Proxy.

46. The method of claim 43, wherein the table is maintained at multiple NHN components of the NHN.

47. The method of claim 43, wherein the plurality of internal identifiers are Pseudo International Mobile Subscriber Identifiers (P-IMSIs).

48. The method of claim 43, wherein the plurality of intermediate subscriber identifiers are established via negotiation between the NHN and the one or more non-MNO PSP networks.

49. The method of claim 43,
wherein the table maps the internal identifier to the same intermediate subscriber identifier for at least one other non-MNO PSP network of the given UE, or wherein the table maps the internal identifier to a different intermediate subscriber identifier for the at least one other non-MNO PSP network of the given UE.

50. The method of claim 43,
wherein the SCEF-related message originates at the given UE, or
wherein the SCEF-related message originates at a network component of the NHN.

51. The method of claim 43,
wherein the forwarding forwards the SCEF-related message directly to the given non-MNO PSP network, or
wherein the forwarding forwards the SCEF-related message indirectly to the given non-MNO PSP network via one or more intermediate NHN components.

52. A component of a Neutral Host Network (NHN), comprising:
at least one processor coupled to at least one transceiver and configured to:
maintain a table that maps a plurality of internal identifiers configured to identify a plurality of user equipments (UEs) within the NHN to a plurality of intermediate subscriber identifiers configured to identify the plurality of UEs on an interface between the NHN and one or more non-Mobile Network Operator (MNO) Participating Service Provider (PSP) networks;
obtain, from a given non-MNO PSP network, a Service Capability Exposure Function (SCEF)-related message in association with a first identifier maintained in the table for a given UE;
retrieve, from the table, a second identifier that is mapped to the first identifier within the table; and
perform an action on the SCEF-related message using the retrieved second identifier, wherein the first identifier is an intermediate subscriber identifier, wherein the plurality of intermediate subscriber identifiers are established via negotiation between the NHN and the one or more non-MNO PSP networks.

53. The component of claim 52,
wherein the retrieved second identifier is a retrieved internal identifier, and
wherein the action is processing the SCEF-related message using the retrieved internal identifier.

54. The component of claim 53,
wherein the table is maintained at a single NHN component of the NHN, or
wherein the table is maintained at multiple NHN components of the NHN.

55. The component of claim 53,
wherein the table maps the retrieved internal identifier to the same intermediate subscriber identifier for at least one other non-MNO PSP network of the given UE, or
wherein the table maps the retrieved internal identifier to a different intermediate subscriber identifier for the at least one other non-MNO PSP network of the given UE.

56. The component of claim 53,
wherein the SCEF-related message is targeted to the given UE, or
wherein the SCEF-related message is targeted to a network component of the NHN.

57. The component of claim 52,
wherein the first identifier is an internal identifier,
wherein the retrieved second identifier is a retrieved intermediate subscriber identifier, and
wherein the action is forwarding the SCEF-related message to the given non-MNO PSP network in association with the retrieved intermediate subscriber identifier.

58. The component of claim 57,
wherein the table is maintained at a single NHN component of the NHN, or
wherein the table is maintained at multiple NHN components of the NHN.

59. The component of claim 57,
wherein the table maps the retrieved internal identifier to the same intermediate subscriber identifier for at least one other non-MNO PSP network of the given UE, or
wherein the table maps the retrieved internal identifier to a different intermediate subscriber identifier for the at least one other non-MNO PSP network of the given UE.

60. The component of claim 57,
wherein the SCEF-related message originates at the given UE, or
wherein the SCEF-related message originates at a network component of the NHN.

61. The component of claim 57,
wherein the at least one processor forwards the SCEF-related message directly to the given non-MNO PSP network, or
wherein the at least one processor forwards the SCEF-related message indirectly to the given non-MNO PSP network via one or more intermediate NHN components.

* * * * *